US012790975B2

(12) United States Patent
Shah et al.

(10) Patent No.: US 12,790,975 B2
(45) Date of Patent: Nov. 10, 2026

(54) METHODS, APPARATUS, AND SYSTEMS TO MONITOR HEALTH OF A CLOSED LOOP IN A TURBINE ENGINE USING A PHYSICS-BASED MODEL

(71) Applicant: General Electric Company, Schenectady, NY (US)

(72) Inventors: Shishir Paresh Shah, Bengaluru (IN); Subramani Adhiachari, Bengaluru (IN); Stephanie Glynn Cotten, Evendale, OH (US); Daniel A. Niergarth, Evendale, OH (US); Sanjeev Sai Kumar Manepalli, Bengaluru (IN); Donald G. Thompson, Lynn, MA (US); Inenhe Mohammed Khalid, West Chester, OH (US)

(73) Assignee: General Electric Company, Evendale, OH (US)

( * ) Notice: Subject to any disclaimer, the term of this patent is extended or adjusted under 35 U.S.C. 154(b) by 687 days.

(21) Appl. No.: 18/327,026

(22) Filed: May 31, 2023

(65) Prior Publication Data

US 2024/0328343 A1 Oct. 3, 2024

(30) Foreign Application Priority Data

Mar. 28, 2023 (IN) ............................. 202311022527

(51) Int. Cl.
*F01P 11/18* (2006.01)
*G06F 17/12* (2006.01)

(52) U.S. Cl.
CPC .............. *F01P 11/18* (2013.01); *G06F 17/12* (2013.01); *F01P 2031/20* (2013.01); *F05D 2260/213* (2013.01); *F05D 2260/80* (2013.01)

(58) Field of Classification Search
CPC ... F01P 11/18; F01P 11/14; F01P 11/00; F01P 2031/20; F01P 2031/00; G06F 17/12;
(Continued)

(56) References Cited

U.S. PATENT DOCUMENTS 4,865,073 A * 9/1989 Kocher .................. H01H 36/02
137/429
6,564,556 B2 5/2003 Ginter
(Continued)

FOREIGN PATENT DOCUMENTS

CA 2952718 A1 9/2017

OTHER PUBLICATIONS

European Patent Office, "Extended European Search Report," issued in connection with European Patent Application No. 23204307.5, mailed on Mar. 22, 2024, 10 pages.

*Primary Examiner* — Mohamed Charioui
(74) *Attorney, Agent, or Firm* — Hanley, Flight & Zimmerman, LLC

(57) ABSTRACT

Methods, apparatus, systems and articles of manufacture to monitor health of a closed loop system in a turbine engine are disclosed. An example apparatus includes non-linear solver circuitry to: iteratively determine a volume of a gas in a system of a turbine engine based on a pressure measurement, a temperature measurement and a constant that corresponds to the gas, the non-linear solver circuitry to iteratively determine the volume of the gas using a thermodynamic state model; and determine a mass of the gas based on the volume of the gas and a volume of the system; optimization circuitry to iteratively determine a mass loss of the gas based on the mass of the gas using a system of equations; and component control circuitry to adjust use of the system of the gas based on the mass loss of the gas.

18 Claims, 7 Drawing Sheets

(58) Field of Classification Search
CPC .......... G06F 17/11; G06F 17/10; G06F 17/00; F05D 2260/213; F05D 2260/80; F05D 2260/00; G01M 15/02; G01M 15/00; G01D 21/02; G01D 21/00
See application file for complete search history.

(56) References Cited

U.S. PATENT DOCUMENTS

| | | | | |
|---|---|---|---|---|
| 8,397,506 | B1 | 3/2013 | Wright et al. | |
| 9,118,226 | B2 | 8/2015 | Kacludis et al. | |
| 9,739,197 | B2 | 8/2017 | Yang et al. | |
| 9,745,899 | B2 | 8/2017 | Wright et al. | |
| 10,386,259 | B2 | 8/2019 | Zhang et al. | |
| 10,584,635 | B2 | 3/2020 | Armstrong et al. | |
| 11,225,905 | B1 | 1/2022 | Holley et al. | |
| 11,230,948 | B2 | 1/2022 | McAuliffe et al. | |
| 11,492,930 | B2 | 11/2022 | Razak | |
| 2003/0086789 | A1* | 5/2003 | Raghavachari | F04B 11/0008 417/427 |
| 2008/0056946 | A1* | 3/2008 | Ahmad | C12Q 1/26 422/68.1 |
| 2013/0173063 | A1* | 7/2013 | Winkes | G05B 15/02 700/275 |
| 2014/0260622 | A1* | 9/2014 | Ladner | G01F 15/007 73/579 |
| 2014/0330504 | A1* | 11/2014 | Nistler | F02D 41/40 701/104 |
| 2017/0254216 | A1 | 9/2017 | Adibhatla | |
| 2018/0058972 | A1 | 3/2018 | Zhang et al. | |
| 2018/0354641 | A1* | 12/2018 | de Bock | B64D 33/08 |
| 2018/0362190 | A1 | 12/2018 | Chambers et al. | |
| 2019/0169982 | A1* | 6/2019 | Hauge | E21B 47/10 |
| 2019/0195143 | A1* | 6/2019 | Allen | F23R 3/00 |
| 2021/0404911 | A1* | 12/2021 | Cavacece | G01K 7/42 |
| 2022/0136404 | A1* | 5/2022 | Vangari | F01D 17/02 415/118 |
| 2023/0090415 | A1 | 3/2023 | Miller et al. | |

* cited by examiner

METHODS, APPARATUS, AND SYSTEMS TO MONITOR HEALTH OF A CLOSED LOOP IN A TURBINE ENGINE USING A PHYSICS-BASED MODEL

FIELD OF THE DISCLOSURE

This disclosure relates generally to turbine engines and, more particularly, to methods, apparatus, and systems to monitor a closed loop system in a turbine engine.

BACKGROUND

In recent years, turbine engines have been increasingly utilized in a variety of applications and fields. Turbine engines are intricate machines with extensive availability, reliability, and serviceability requirements. Some turbine engines include closed loop systems that capture heat generated at a portion of the engine and provide the captured heat to another portion of the engine to make operation more efficient. For example, heat from a turbine engine and transport the head to a component or stream where the energy may be used more efficiently, such as a fuel stream or a core bypass stream of the turbine engine. In some systems, heat from the exhaust stream may be transferred to one or more components to increase system efficiency.

BRIEF DESCRIPTION OF THE DRAWINGS

In general, the same reference numbers will be used throughout the drawing(s) and accompanying written description to refer to the same or like parts. The figures are not to scale.

DETAILED DESCRIPTION

Figure 1:
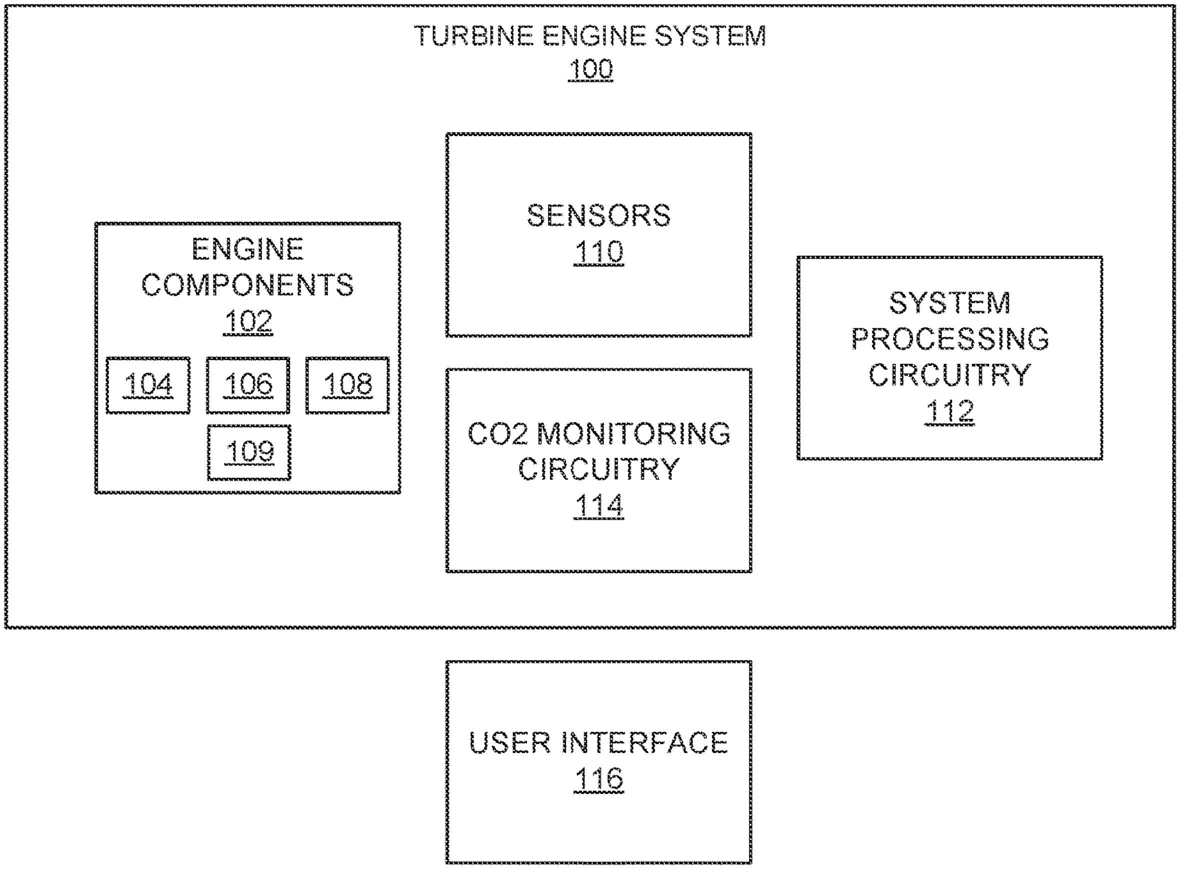
FIG. 1 illustrates an example gas turbine engine that can be utilized within an aircraft in which the examples disclosed herein can be implemented.

As used herein, connection references (e.g., attached, coupled, connected, and joined) can include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" can be used to refer to an element in the detailed description, while the same element can be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that can instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU can be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that can assign computing task(s) to whichever one(s) of the multiple types of processor circuitry is/are best suited to execute the computing task(s).

In the following detailed description, reference is made to the accompanying drawings that form a part hereof, and in which is shown by way of illustration specific examples that can be practiced. These examples are described in sufficient detail to enable one skilled in the art to practice the subject matter, and it is to be understood that other examples can be utilized. The following detailed description is therefore, provided to describe an exemplary implementation and not to be taken limiting on the scope of the subject matter described in this disclosure. Certain features from different aspects of the following description can be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there can be additional elements other than the listed elements.

As used herein, the terms "system," "unit," "module," "engine," "component," etc., can include a hardware and/or software system that operates to perform one or more functions. For example, a module, unit, or system can include a computer processor, controller, and/or other logic-based device that performs operations based on instructions stored on a tangible and non-transitory computer readable storage medium, such as a computer memory. Alternatively, a module, unit, or system can include a hard-wires device that performs operations based on hard-wired logic of the device. Various modules, units, engines, and/or systems shown in the attached figures can represent the hardware that operates based on software or hardwired instructions, the software that directs hardware to perform the operations, or a combination thereof.

A turbine engine, also called a combustion turbine or a gas turbine, is a type of internal combustion engine. Turbine engines are commonly utilized in aircraft and power-generation applications. As used herein, the terms "asset," "aircraft turbine engine," "gas turbine," "land-based turbine engine," and "turbine engine" are used interchangeably. A basic operation of the turbine engine includes an intake of fresh atmospheric air flow through the front of the turbine engine with a fan. In some examples, the air flow travels through an intermediate-pressure compressor or a booster compressor located between the fan and a high-pressure compressor. The booster compressor is used to supercharge or boost the pressure of the air flow prior to the air flow entering the high-pressure compressor. The air flow can then travel through the high-pressure compressor that further pressurizes the air flow. The high-pressure compressor includes a group of blades (e.g., fans) attached to a shaft. The blades spin at high speed and subsequently compress the air flow. The high-pressure compressor then feeds the pressurized air flow to a combustion chamber. In some examples, the high-pressure compressor feeds the pressurized air flow at speeds of hundreds of miles per hour. In some instances, the combustion chamber includes one or more rings of fuel injectors that inject a steady stream of fuel into the combustion chamber, where the fuel mixes with the pressurized air flow.

In the combustion chamber of the turbine engine, the fuel is ignited with an electric spark provided by an igniter, where the fuel, in some examples, burns at temperatures of more than 2000 degrees Fahrenheit. The resulting combustion produces a high-temperature, high-pressure gas stream (e.g., hot combustion gas) that passes through another group of blades called a turbine. In some examples, a turbine includes an intricate array of alternating rotating and stationary airfoil-section blades. Alternatively, the turbine can be structured with adjacent rotating or stationary airfoil section blades, or in any combination of alternating or adjacent airfoil-section blades. As the hot combustion gas passes through the turbine, the hot combustion gas expands, causing the rotating blades to spin. The rotating blades serve at least two purposes. A first purpose of the rotating blades is to drive the booster compressor and/or the high-pressure compressor to draw more pressured air into the combustion chamber. For example, the turbine is attached to the same shaft as the high-pressure compressor in a direct-drive configuration, thus, the spinning of the turbine causes the high-pressure compressor to spin. A second purpose of the rotating blades is to spin a generator operatively coupled to the turbine section to produce electricity. For example, the turbine can generate electricity to be used by an aircraft, a power station, etc.

In the example of an aircraft turbine engine, after passing through the turbine, the hot combustion gas exits the aircraft turbine engine through a nozzle at the back of the aircraft turbine engine. As the hot combustion gas exits the nozzle, the aircraft turbine engine and the corresponding aircraft coupled to the aircraft turbine engine are accelerated forward (e.g., thrusted forward). In the example of a land-based turbine engine, after passing through the turbine, the hot combustion gas is dissipated, used to generate steam, etc.

Some turbine engines include Advanced Brayton Cycle (ABC) systems. ABC systems take heat from part of the engine and deliver it to another part of the engine to increase efficiency of the engine. For example, an ABC system can access heat from a turbine engine and transport the heat to a component or stream where the energy may be used more efficiently, such as a fuel stream or a core bypass stream of the turbine engine. In some systems, heat from the exhaust stream may be transferred to one or more components to increase system efficiency.

To further increase efficiency of turbine engines, carbon dioxide (CO2) is used as a working fluid. Supercritical CO2 (sCO2) is CO2 that is held above a critical temperature and pressure causing the fluid to act like a gas while having density of a liquid, resulting in a highly efficient fluid to generate power. Because sCO2 is used in closed loop turbine engine systems, if CO2 is leaked out of the system, the turbine engine may not be able to operate efficiently and/or can cause issues and/or damage in the turbine engine. Examples disclosed herein utilize a physics-based model to identify a mass of sCO2 in a closed loop system to be able to identify and/or track an sCO2 leak. Examples disclosed herein can generate one or more alerts based on an amount of sCO2 and/or a rate of sCO2 loss. Additionally, examples disclosed herein reroute heat to a different path and/or disable sCO2 based systems based on the amount of sCO2 and/or the rate of sCO2 loss.

Although examples disclosed herein track CO2 in a closed loop system, examples disclosed herein can track any type of chemical compound in a closed loop system to identify leaks of the tracked chemical compound.

FIG. 1 is a schematic illustration of an example turbine engine system 100. The turbine engine system 100 includes example engine components 102, example sensors 110, examples system processing circuitry 112, and example CO2 monitoring circuitry 114. FIG. 1 further includes an example user interface 116. The engine components 102 include example heat exchanger(s) 104, example pump(s) 106, example valve(s) 108, an example CO2 system 109, and/or various other components (e.g., fans, compressors, blades, rotors, etc.).

The turbine engine system 100 of FIG. 1 is a turbine system that can be implemented in a plane. However, the turbine engine system 100 can be implemented in any system that operates using an engine. For example, the turbine engine system 100 can be implemented in a train, a ship, an electrical generator, a pump, a compressor, a tank, etc. The engine components 102 include the components that allow the turbine engine system 100 to operate. The CO2 system 109 can include one or more of the heat exchanger(s) 104, pump(s) 106, and/or valve(s) 108 in one or more closed loops that utilize sCO2. In some examples, the CO2 monitoring circuitry 114 controls one or more components of the engine components 102 based on the mass of CO2 and/or the change of mass of the CO2 to (a) disable systems and/or loops corresponding to the CO2 and/or (b) reroute heat in from one component to another.

The sensors 110 can be located on any portion(s) of the turbine engine system 100 to sense, gather, and/or obtain information. For example, the sensor(s) 110 can include temperature sensor(s) (e.g., ambient temperature and/or CO2 temperature), flowrate sensor(s), pressure sensor(s), etc. The information obtained from the sensor(s) 110 can be transmitted to the system processing circuitry 112, the CO2 monitoring circuitry 114, and/or the user interface 116.

The system processing circuitry 112 of FIG. 1 can process the information obtained from the sensor(s) 110 and/or based on the characteristics of the engine components 102 to generate models (e.g., numerical propulsion system simulation (NPSS) models), lookup tables, and/or other information related to the obtained information. In some examples, the system processing circuitry 112 can create a lookup table or model that can associated information obtained from the sensor(s) 110 to particular input heat (e.g., thermal energy) (Qin) or heat loss or thermal energy loss (Qloss) values. For example, the system processing circuitry 112 can model heat or thermal values (e.g., Qin and/or Qloss) by multiplying a mass flow by a change in temperature by a specific heat. The mass flow can be measured by one of the sensors 110 and/or assumed, the change in temperature can be measured by one of the sensors 110, and the specific heat may be a constant value or may be calculated based on temperature, pressure, and/or a gas/liquid mixture fraction. The Qin and Qloss values are used by the CO2 monitoring circuitry 114, as further described below. In some examples, the model generated by the system processing circuitry 112 (e.g., the NPSS model) may be a digital twin of the turbine engine system 100.

The CO2 monitoring circuitry 114 of FIG. 1 monitors the CO2 in the system by using a physics-based trend monitoring algorithm(s) to determine leakage information corresponding to the CO2 in a closed loop transiently. The physics-based trend monitoring algorithm may include a first algorithm and/or model that is a dynamic model and a second algorithm and/or model that is based on information from the system processing circuitry 112 (e.g., the NPSS model). The CO2 monitoring circuitry 114 may use the dynamic model to determine CO2 information (e.g., a mass, volume, amount of leakage, etc. of CO2) at start-up of the turbine engine system 100. The CO2 monitoring circuitry 114 may use the second model during using of the turbine engine system 100 (e.g., using information determined with the physics-based model). The dynamic physics-based trend monitoring algorithm includes a thermodynamic model or measurement system for modeling phase transfer coupled with flow and heat transfer models to predict the rate of temperature and pressure rise in an ABC loop that uses sCO2 from the sCO2 system 109. The CO2 monitoring circuitry can, based on the output of the thermodynamic model, generate an alert and/or alarm to the user interface 116. In some examples, the CO2 monitoring circuitry 114 generates alerts based on the degree of mass loss (e.g., also referred to as leakage). For example, the CO2 monitoring circuitry 114 generates a first alert (e.g., a minor alert) when there is more than a first threshold amount of leakage of CO2 and a second alert (e.g., a major alert) when there is more than a greater second threshold amount of leakage of CO2. In some examples, the CO2 monitoring circuitry 114 determines a rate of leakage based on a current measurement and one or more previous measurements and generates one or more alerts (e.g., based on the degree or rate of mass loss) and/or adjusts the engine components 102 based on the rate of leakage. Additionally, the CO2 monitoring circuitry 114 can control the engine components 102 to prevent the start of the CO2 system 109 and/or reroute heat flow based on the output of the thermodynamic model. The CO2 monitoring circuitry 114 combines the thermodynamic state prediction (e.g., pressure information, temperature information, etc.) and sensor data against a threshold thermal time constant (also referred to as a time constant) to determine when it is safe to start the CO2 system 109 and avoid issues related to the CO2 system 109. The CO2 monitoring circuitry 114 continuously estimates a critical mass of CO2 in a loop to ensure efficient working of an ABC cycle. The CO2 monitoring circuitry 114 outputs any generated information to the user interface 116. In some examples, the CO2 monitoring circuitry 114 can be any type of chemical compound monitoring circuitry. The CO2 monitoring circuitry 114 is further described below in conjunction with FIG. 2.

The user interface 116 of FIG. 1 outputs information generated by the CO2 monitoring circuitry. For example, the user interface 116 can output one or more alerts, mass loss/leakage of CO2, mass of CO2, amount of time, miles, and/or flights until maintenance is required, and/or any information related to the CO2 in the turbine engine system 100. The user interface 116 can be included the device that includes the turbine engine system 100 (e.g., a user interface in the control center of a plane) and/or in an external device (e.g., a maintenance device that is connected to the processor (e.g., a full authority digital engine (FADEC) system) associated with the turbine engine system 100 via a wired or wireless connection). For example, the user interface 116 can let a pilot know that there is minor or major leakage and can identify a mitigating action that has been performed (e.g., the CO2 system 109 being disabled and/or the diverting/rerouting of flow of heat by reconfiguring the heat exchanger(s) 104 and/or the valve(s) 108 to divert the heat from the CO2 system 109 to another component). In some examples, the user interface 116 can be implemented in a maintenance device that interfaces with a processor associated with the turbine engine system 100 during maintenance of the turbine engine system 100 (e.g., between flights).

Figure 2:
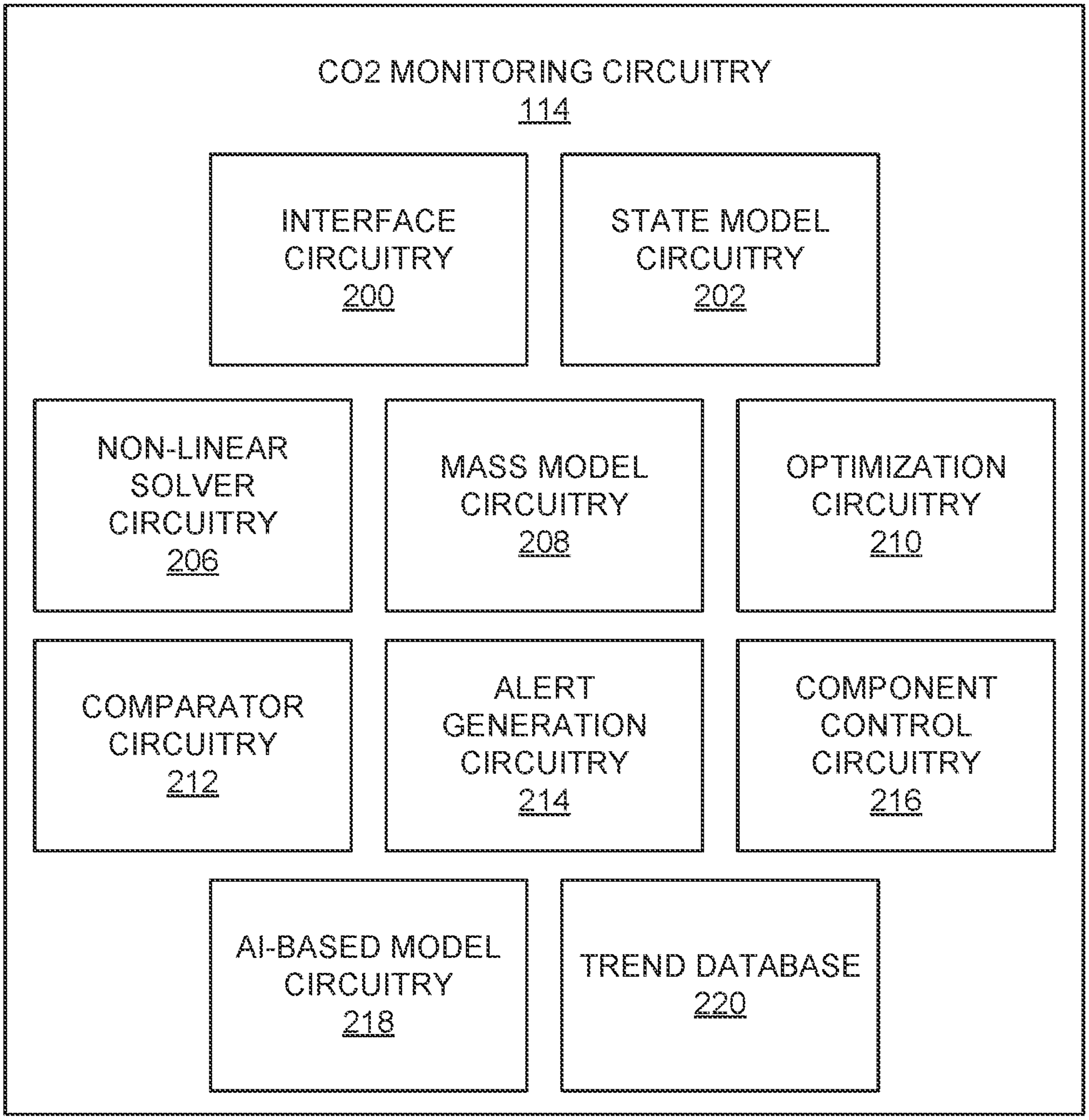
FIG. 2 is a block diagram of an example carbon dioxide monitoring circuitry of FIG. 1.

FIG. 2 is a block diagram of the example CO2 monitoring circuitry 114 of FIG. 1. The example CO2 monitoring circuitry 114 includes example interface circuitry 200, example state model circuitry 202, example non-linear solver circuitry 206, example mass model circuitry 208, example optimization circuitry 210, example comparator circuitry 212, example alert generation circuitry 214, example component control circuitry 216, example artificial intelligence (AI)-based model circuitry 218, and an example trend database 220.

The interface circuitry 200 of FIG. 2 obtains sensor information and/or processed sensor information from the sensors 110 and/or the system processing circuitry 112. For example, the sensor information may include flowrate information, ambient temperature information, pressure and temperature information related to the CO2 system 109, time taken to reach an operating condition from start, total volume of the system, initial mass of sCO2, change in mass from previous cycles, mass of CO2 at a start of a loop of the dynamic model (e.g., when implementing a NPSS model), vibration response information, altitude information, etc. Additionally, the processed sensor information may include models and/or lookup tables from the system processing circuitry 112 that can be used to determine the heat transfer rate (Q) based on other obtained data.

The state model circuitry 202 generates a thermodynamic state model. The thermodynamic state model can be used by the non-linear solver circuitry 206 to estimate a volume of the CO2 in a closed loop and derive the mass of the CO2 based on the volume estimate, as further described below. The state model circuitry 202 can generate a Peng Robinson Model and/or any other thermodynamic state model. An example of a Peng Robinson Model is shown below in conjunction with Equation 1:

$$p = \frac{RT}{V-b} - \frac{a\alpha}{V^2 - 2bV - b^2}. \quad \text{(Equation 1)}$$

In the above-Equation 1, p is the pressure measurement of the CO2 from one of the sensors 110, R is the gas constant (e.g., 8.3145 Joules*$mol^{-1}$*$Kelvin^{-1}$), T is the temperature measurement of the CO2 from one of the sensors 110, V is volume of CO2, and a, b, and α are constants the correspond to the thermodynamic state of the CO2 system. The equations for a, b, and α are shown below in Equations 2-7:

$$a = \frac{045724R^2T_c^2}{P_c} \quad \text{(Equation 2)}$$

$$b = \frac{0.07780RT_c}{P_c} \quad \text{(Equation 3)}$$

$$\alpha = \left(1 + k\left(1 - T_r^{0.5}\right)\right)^2, \quad \text{(Equation 4)}$$

where $$k = 0.37464 + 1.54266\omega - 0.26992\omega^2 \quad \text{(Equation 5)}$$

when $$\omega \le 0.49$$

$$k = 0.379642 + 1.48503\omega - 0.164423\omega^2 + 0.016666\omega^3 \quad \text{(Equation 6)}$$

when $$\omega > 0.49$$

$$T_r = T / T_c \quad \text{(Equation 7)}$$

In the above-Equations 2-7, Tc, Pc and ω are properties of the CO2. However, the Tc, Pc, ω and/or other parts of Equations 2-7 can be different based on different experimental data, systems, etc. The state model circuitry 202 outputs the thermodynamic state model to the non-linear solver circuitry 206. The state model circuitry 202 determines the values of the constants (e.g., a, b, and α) based on the thermodynamic state of the system (e.g., pressure and/or temperature at critical point). The state model circuitry 202 can additionally determine a value for the latent heat or latent thermal energy (Qlatent_heat) based on the thermodynamic state of system. The Qlatent_heat is used in a system of equations that the optimization circuitry uses to solve for the mass loss of CO2, as further described below.

In some examples, the state model circuitry 202 determines a state of the CO2 (e.g. liquid, gas, supercritical) based on the temperature and pressure of the CO2. In some examples, the sCO2 state model circuitry determines the state of the CO2 based on the density (based on mass and volume) of the CO2. The state model circuitry 202 can determine the state of the CO2 based on a lookup table that corresponds temperatures, pressures, and/or densities to particular states. For example, the critical point of CO2 is approximately 88° Fahrenheit (F) at 1000 pounds per square inch absolute (PSIA). Accordingly, the measured temperature and pressure can be used to determine the state of the CO2 (e.g., based on whether the temperature and/or pressure is above the critical point temperature and/or pressure(s)). The state of the CO2 may be included in a report and/or output on the user interface 116.

The non-linear solver circuitry 206 solves for a volume of the CO2 by selecting a volume estimate (e.g., specific volume V which has units volume per unit mass) and iteratively adjusting the volume estimate until the estimate satisfies the thermodynamic state model generated by the state model circuitry 202. The non-linear solver circuitry 206 applies the obtained pressure and temperature information of the CO2 and the values of the constants (e.g., a, b, and α) based on the determined thermodynamic state to the thermodynamic state model to determine a residual. For example, using the Peng Robinson model of the above-Equation 1, the non-linear solver circuitry 206 applies a volume estimate (V) to the below Equation 8 to determine the residual:

$$p - \frac{RT}{V-b} - \frac{a\alpha}{V^2 - 2bV - b^2} = \text{Residual}. \quad \text{(Equation 8)}$$

The non-linear solver circuitry 206 compares the residual to a threshold (e.g., a tolerance threshold). If the non-linear solver circuitry 206 determines that the residual does not satisfy the tolerance threshold (e.g., the residual is larger than the tolerance threshold), the non-linear solver circuitry 206 adjusts the value of the volume estimate and recalculates the residual. The non-linear solver circuitry 206 continues to iterate through volume estimates until the residual satisfies the threshold (e.g., is less than the tolerance threshold). The volume estimate that results in a residual less than the tolerance threshold (e.g., 1e-6) is the output volume estimate of the CO2 in the closed loop system and/or CO2 system 109. After the volume estimate of CO2 is determined, the non-linear solver circuitry 206 determines the derived mass of the CO2 by dividing the total volume of the one or more components of the CO2 system 109 and/or other container by the estimated specific volume (e.g., V/(V/unit mass)=mass). Additionally or alternatively, the mass can be determined based on the density of CO2 (e.g., density*volume=mass), if the density of CO2 is known. The non-linear solver circuitry 206 outputs the volume estimate of CO2 and the derived mass of CO2 to the optimization circuitry 210.

The mass model circuitry 208 generates a system of equations that corresponds to the mass loss of CO2. For example, the mass model circuitry 208 can generate the below Equations 9 and 10 that can be solved to determine the mass loss of CO2:

$$\frac{\partial m}{\partial t} = \frac{\partial \rho V}{\partial t} = m_{co2} - m_{loss} \quad \text{(Equation 9)}$$

and/or $$\text{Residual} = m_{co2} - m_{loss-}\frac{\partial \rho V}{\partial t}$$

$$\frac{\partial m C_p T}{\partial t} = \frac{\partial \rho V C_p T}{\partial t} = Q_{in} - Q_{loss} + Q_{latent\ heat}. \quad \text{(Equation 10)}$$

In the above-Equations 9, $$\frac{\partial m}{\partial t}$$

is the derivative or change in mass over time (e.g., the difference between the derived mass and a previously derived mass), $$\frac{\partial \rho V}{\partial t}$$

is also the derivative or change of mass over time, where ρV is equal to the mass (e.g., ρ is the density of CO2 and V is the volume of CO2). Additionally, $m_{co2}$ is the mass of CO2 and $m_{loss}$ is the loss in mass of CO2. Qlatent heat may be positive or negative based on the condensation or evaporation of the CO2. In the above-Equation 10, Cp is the specific heat of CO2 (e.g., 37 . . . 35 Kilojoules/kilogram Kelvin), T is the temperature of CO2, Qin is the input heat/energy in the system, Qloss is the lost heat/energy in the system and Q latent heat is the latent heat/energy of the system. In some examples, Qloss includes (a) the thermal energy and/or heat that is purposefully leaving the system in other heat exchangers and (b) the amount of thermal energy and/or heat lost to the environment as a form of inefficiency. In examples, where Qloss does not include the thermal energy and/or heat that is purposefully leaving the system, Equation 10 may include Qout (e.g., $Q_{in}-Q_{loss}-Q_{out}+Q_{latent\ heat}$) to account for the thermal energy and/or heat that is purposefully leaving the system. The mass model circuitry 208 outputs the system of equations to the optimization circuitry 210 to solve for the mloss.

The optimization circuitry 210 of FIG. 2 solves for a loss of mass of the CO2 by selecting a loss of mass of CO2 and iteratively adjusting the loss of mass estimate until the estimate satisfies the system of equations generated by the mass model circuitry 208. For example, the optimization circuitry 210 selects a loss of mass estimate (e.g., 2.0E-4 pound mass (lbm)/hour) and plugs the estimate into the above Equation 9 to generate a residual and continually adjusts the loss of mass estimate for one or more iteration(s) until the residual is below a threshold. The optimization circuitry 210 can solve for the mass loss using information sensed from the sensors (e.g., pressure measurement(s) (ambient or within the CO2 system 109), temperature measurements (ambient or within the CO2 system 109), flow rate measurements, etc.) The optimization circuitry 210 obtains and/or determines (a) a change in mass with respect to time (dm/dt) by comparing the current mass of CO2 to a previously determined mass of CO2, (b) a change in volume with respect to time (dV/dt) by comparing the current volume estimate to a previous volume estimate, and (c) a change in temperature with respect to time (dT/dt) by comparing the current temperature measurement to a previous temperature measurement. Additionally, the optimization circuitry 210 further obtains a derived mass of CO2 (e.g., between 1-15 pound mass (lbm))) from the non-linear solver circuitry 206. The optimization circuitry 210 determines a Qin based on a function of temperature of the system (e.g., ambient temperature). The optimization circuitry 210 determines a Qloss based on a function of local conditions of operation of a device implementing a turbine engine (e.g., a state of a flight, where the flight is, etc.). In some examples, the optimization circuitry 210 obtains Qloss, Qin based on information from the system processing circuitry 112, as described above in conjunction with FIG. 2. However, in some examples, an accuracy of the system processing circuitry 112 can be based on the health status of the engine components 102. Accordingly, the optimization circuitry 210 can check a health status of the engine components 102 and if the health status is below a threshold, determine Qin, Qloss without relying on the system processing circuitry 112. The optimization circuitry 210 determines a Qlatent_heat based on a function of the thermodynamic state. For example, if a phase transfer occurs, the optimization circuitry 210 can identify adjustment for the Qlatent_heat. The optimization circuitry 210 applies the obtained and/or determined values and the mloss estimate to the system of equations resulting in a residual. If the estimated mloss estimate is good, the residual will be low (e.g., less than a tolerance threshold). Accordingly, the optimization circuitry 210 compares the residual to a threshold (e.g., a tolerance threshold) and adjust the mloss estimate if the residual does not satisfy the threshold (e.g., if the residual is above the threshold). After the mloss estimate is adjusted, the process is iteratively repeated with additional mloss adjustments until the residual is below the threshold. The mloss estimate that results in a residual less than the tolerance threshold is the output mloss estimate of the CO2 in the closed loop system and/or CO2 system 109. The optimization circuitry 210 outputs the mloss estimate, the change in mass from the initial mass (e.g., by summing up all previous mloss estimates and subtracting from the original mass of CO2), the change of mass with respect to time (e.g., the rate of CO2 loss), the change in pressure with respect to time, and/or the change in temperature with respect to time.

The example comparator circuitry 212 compares one or more outputs of the optimization circuitry 210 to one or more threshold(s). For example, the comparator circuitry 212 can compare the mass of CO2 or the loss of CO2 to one or more threshold(s) (e.g., corresponding to when the mass of CO2 is sufficient, low but functional, or too low for proper operation). In some examples, the optimization circuitry 210 can determine the thermal time constant of the CO2 based on the mloss estimate, the change in mass from the initial mass (e.g., by summing up all previous mloss estimates and subtracting from the original mass of CO2), the change of mass with respect to time, the change in pressure with respect to time, and/or the change in temperature with respect to time. In such examples, the comparator circuitry 212 can compare the determined time constant to one or more time constant threshold(s) (e.g., to determine if the determine time constant is acceptable, not acceptable but functional, or not acceptable and not functional). In some examples, the comparator circuitry 212 can compare mass, volume, and/or temperature trends/rates against one or more rate thresholds. For example, the comparator circuitry 212 can compare the rate of loss of mass of CO2 by comparing the current mloss calculation to a previous mloss calculation. In such an example, the comparator circuitry 212 can compare the rate of loss of mass or CO2 to one or more thresholds to determine if the rate of loss is acceptable or not. If the turbine engine system 100 and/or the CO2 system 109 corresponds to a constant temperature, but the pressure has decreased, the mass of the CO2 may have been lost. Additionally, if the Q measurements on the non-CO2 components of the heat exchanger are known, the CO2 monitoring circuitry 114 can determine mass of the CO2 based on the pressure or temperature at a given location. Thus, the comparator circuitry 212 can consider multiple thresholds and/or combination of thresholds which are dependent on the mass of the turbine engine system 100 and/or the CO2 system 109. The total mass loss/leakage (e.g., based on a direct calculation of mass), the pump speed (e.g., pump speed increases as mass decreases with thresholds on the minimum and/or maximum speed limits), the system thermal energy values (e.g., engine system requirements are not met on the non-CO2 side of the heat exchanger due to lack of mass in the system), etc. may all be compared to corresponding thresholds to generate an alert and/or adjust the system. The comparison against the threshold(s) can be used to determine when it is safe to start the CO2 system 109 to avoid issues related to the CO2 system 109.

In some examples, the comparator circuitry 212 of FIG. 2 compares vibration data and/or vibration signatures of one or more of the engine components 102 of the turbine engine system 100 to one or more stored vibration signatures (e.g., stored in memory) that correspond to CO2 leakage and/or mass loss. For example, the comparator circuitry 212 can obtain vibration data collected from the one or more sensor (s) 110 and compare the vibration data to one or more thresholds that correspond to an amount of leakage and/or mass loss. For example, a database and/or lookup table of vibration patterns may include vibration patterns that correspond to an amount of CO2 leakage. In such an example, if the comparator circuitry 212 determines that the sensed vibration data corresponds to a vibration pattern and/or signature in the database, the comparator circuitry 212 may use the database and/or lookup table to determine how much leakage corresponds to the matched vibration pattern. In some examples, the vibration data includes the amount of vibration of a component, the amount of variation of vibration over time, a signature corresponding to an oscillation of vibration over time, etc. For example, the comparator circuitry 212 can generate a signature corresponding to a vibration pattern of a duration of time (e.g., 1 second (s), 10 s, 1 minute, etc.) and compare the generated signature to database signatures stored in memory. The database signatures correspond to vibration patterns (e.g., oscillating between 3 gigahertz and 5 gigahertz every second) that correspond to an amount of leakage. The database signatures may be generated during manufacturer of the turbine engine system 100, maintenance of the turbine engine system 100, use of the turbine engine system 100, testing and/or use of a different turbine engine system that is the same or similar to the turbine engine system 100, etc. Accordingly, the comparator circuitry 212 can compare the vibration data to one or more thresholds to generate one or more alerts and/or adjust the engine components 102 based on the comparison (e.g., when the vibration pattern matches a database vibration pattern or when the vibration data is outside of a range of acceptable vibration and/or rate of oscillation change).

The alert generation circuitry 214 of FIG. 2 generates one or more alerts based on the result of the one or more comparison(s). For example, if the mass of CO2 is below a first threshold, the alert generation circuitry 214 generates an alert indicating that the mass of CO2 is low and/or can determine when maintenance can be needed (e.g., how many flights, hours, etc. until maintenance is needed to resupply CO2). If the mass of CO2 is below a second threshold, the alert generation circuitry 214 can generate an alert indicating that the CO2 level is too low and that actions can have been or need to be performed. The alert is output (e.g., via the interface circuitry 200) to the user interface 116 as an audio alert, a visual alert, and/or any other type of alert or warning. Additionally or alternatively, the alert can be based on the loss of CO2, the rate of CO2 loss, the determined time constant, and/or any other comparison performed by the comparator circuitry 212 that results in a measurement not satisfying one or more thresholds. The alerts give a user and/or maintenance person a chance to plan their maintenance and/or charging cycle to refill the CO2 based on the amount of leakage to help run the engine efficiently.

The component control circuitry 216 of FIG. 2 adjusts the engine components 102 based on one or more comparisons of the comparator circuitry 212. For example, if the comparator circuitry 212 determines that the mass of CO2 is below one or more thresholds, the component control circuitry 216 can disable the use of the CO2 system 109 and/or control the heat exchange(s) 104 and/or valve(s) 108 to divert and/or reroute heat from the CO2 system 109 to another one of the engine components 102. For example, if the comparator circuitry 212 determines that the mass of CO2 is below a first threshold (e.g., 3 lbm when the initial mass was 4 lbm), the component control circuitry 216 adjust the valve and/or pump schedule to divert heat to other engine components 102. The diverted heat can be used to increase efficiency of another engine components 102. If the comparator circuitry 212 determines that the mass of the CO2 is below a second threshold (e.g., 2 lbm), the component control circuitry 216 can shut down and/or disable the entire sCO2 system/loop and recommend engine de-rate.

The example AI-based model circuitry 218 implements an AI-based model (e.g., a machine learning model, a neural network, a self-learning neural network, a deep learning model, a decision tree classification model, and/or other AI-based model) to implement one or more components of the example CO2 monitoring circuitry 114. In some examples, the AI-based model circuitry 218 can be used to implement the optimization circuitry 210. For example, the AI-based model circuitry 218 can executed a self-learning neural network, decision tree classification model, etc., to determine a trend and/or rate corresponding to mass of CO2, pressure of CO2, temperature of CO2, mass loss of CO2, etc. In such an example, the AI-based model circuitry 218 executes a trend monitoring algorithm that compares sensor inputs accounting ambient conditions with an acceptable trend database 220 to identify deviation from the trends. In some examples, the AI-based model circuitry 218 can utilize pressure measurement, temperature measurements, vibration measurements, time constants, etc., or a combination thereof, to create an ensemble model. The acceptable trend database 220 can be generated for different flight cycles and/or different ambient conditions. The database can be updated with new field data based on a successful flight cycle (e.g., to learn and/or adjust the model based on the trend corresponding to a successful cycle). The output of the model can be used by the example alert generation circuitry 214, and/or the component control circuitry 216 to generate an alert and/or adjust the engine components 102 based on the comparison of the output to one or more thresholds (e.g., which can be performed by the comparator circuitry 212).

While an example manner of implementing the CO2 monitoring circuitry 114 of FIG. 1 is illustrated in FIG. 2, one or more of the elements, processes, and/or devices illustrated in FIG. 2 can be combined, divided, re-arranged, omitted, eliminated, and/or implemented in any other way. Further, the example interface circuitry 200, the example state model circuitry 202, the example non-linear solver circuitry 206, the example mass model circuitry 208, the example optimization circuitry 210, the example comparator circuitry 212, the example alert generation circuitry 214, the example component control circuitry 216, and/or, more generally, the example CO2 monitoring circuitry 114 of FIG. 1, can be implemented by hardware alone or by hardware in combination with software and/or firmware. Thus, for example, any of the example interface circuitry 200, the example state model circuitry 202, the example non-linear solver circuitry 206, the example mass model circuitry 208, the example optimization circuitry 210, the example comparator circuitry 212, the example alert generation circuitry 214, the example component control circuitry 216, and/or, more generally, the example CO2 monitoring circuitry 114, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example CO2 monitoring circuitry 114 of FIG. 1 can include one or more elements, processes, and/or devices in addition to, or instead of, those illustrated in FIG. 2, and/or can include more than one of any or all of the illustrated elements, processes and devices.

Figure 3A:
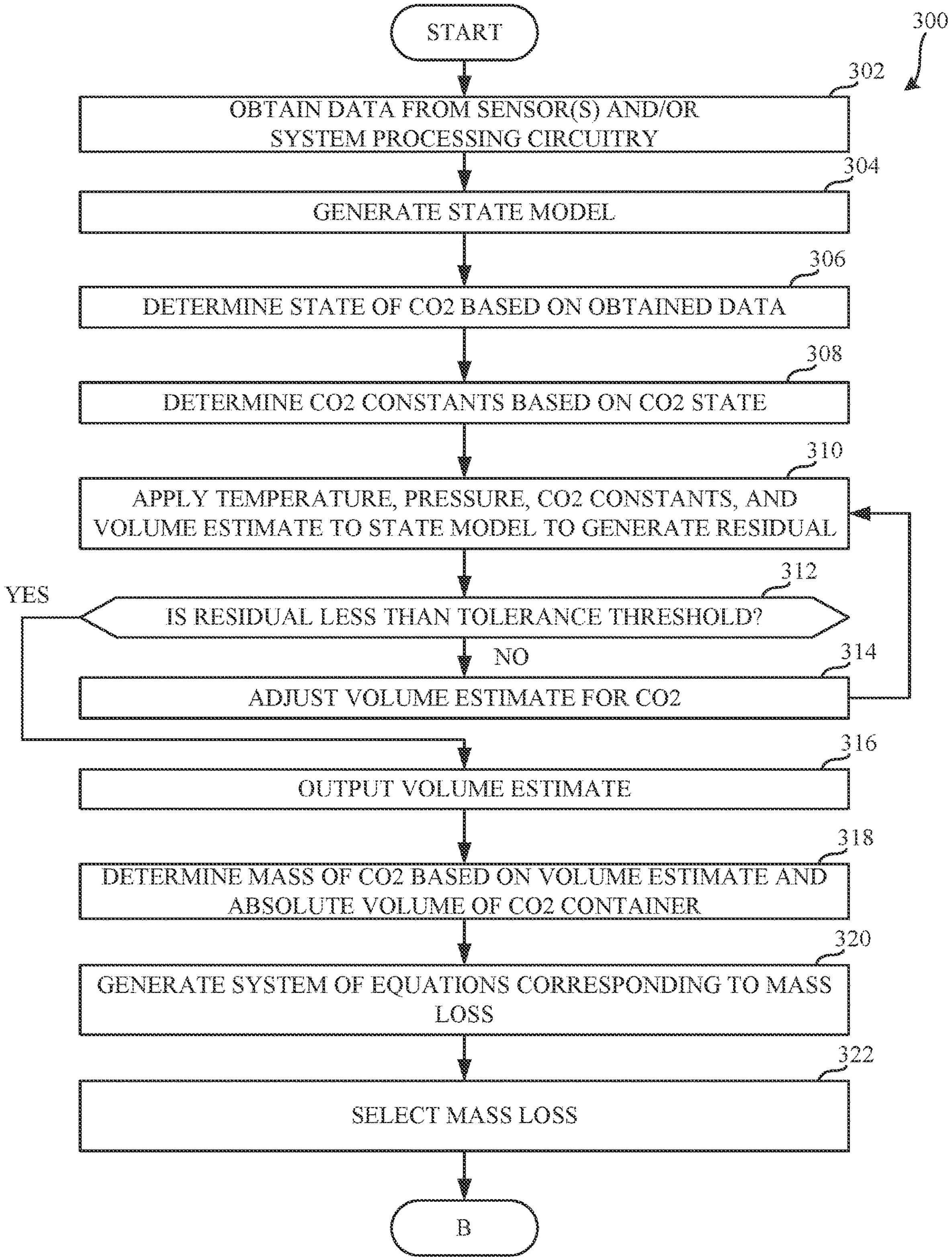
FIG. 3A illustrates a flowchart representative of example machine readable instructions and/or example operations that can be executed by example processor circuitry to implement the example carbon dioxide monitoring circuitry of FIG. 2.
Figure 3B:
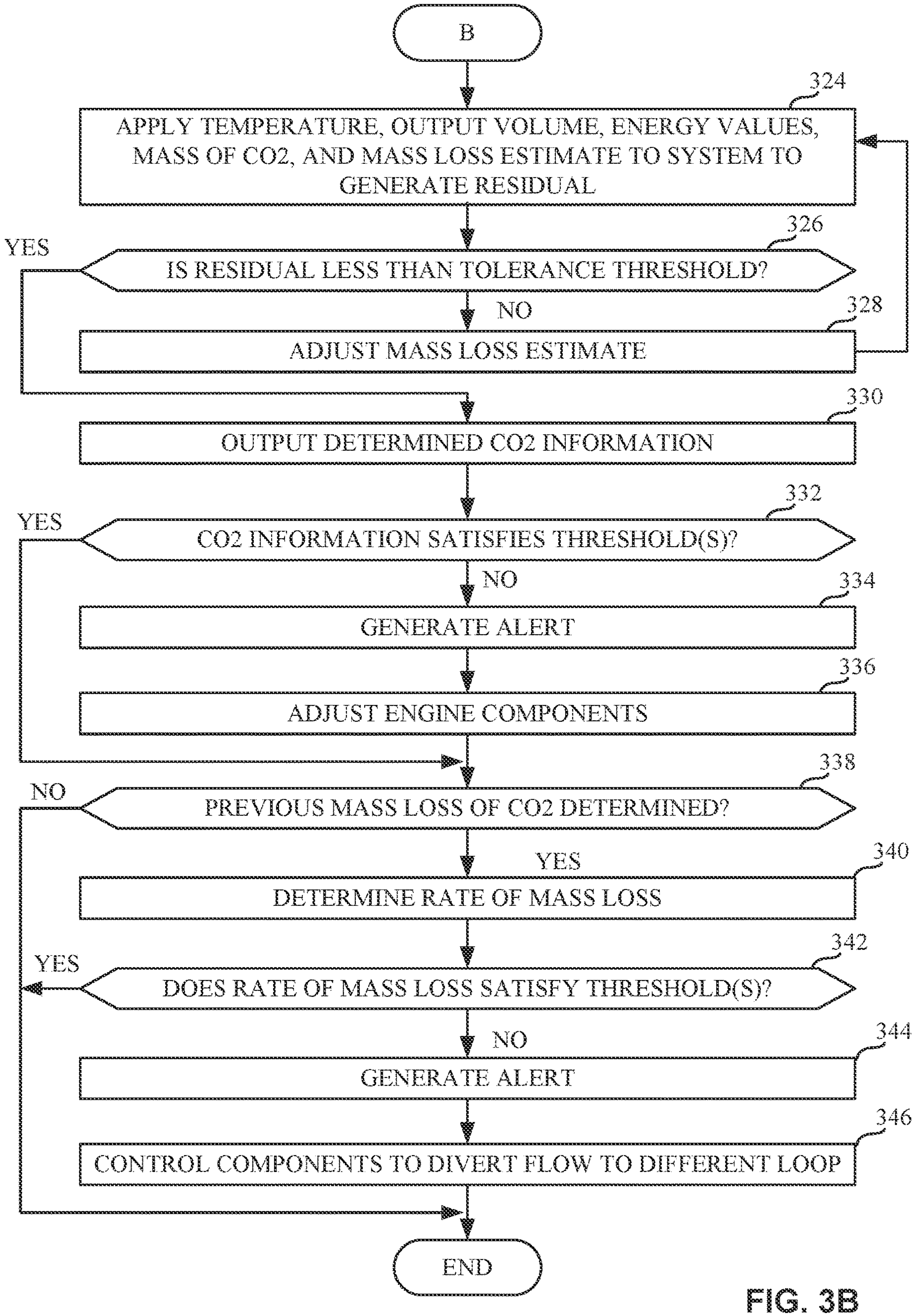
FIG. 3B illustrates a flowchart representative of example machine readable instructions and/or example operations that can be executed by example processor circuitry to implement the example carbon dioxide monitoring circuitry of FIG. 2.

A flowchart representative of example machine readable instructions, which can be executed to configure processor circuitry to implement the CO2 monitoring circuitry 114 of FIG. 2, is shown in FIGS. 3A-3B. The machine readable instructions can be one or more executable programs or portion(s) of an executable program for execution by processor circuitry, such as the processor circuitry 412 shown in the example processor platform 400 discussed below in connection with FIG. 4 and/or the example processor circuitry discussed below in connection with FIGS. 5 and/or 6. The program can be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions can be distributed across multiple hardware devices and/or executed by two or more hardware devices (e.g., a server and a client hardware device). For example, the client hardware device can be implemented by an endpoint client hardware device (e.g., a hardware device associated with a user) or an intermediate client hardware device (e.g., a radio access network (RAN)) gateway that can facilitate communication between a server and an endpoint client hardware device). Similarly, the non-transitory computer readable storage media can include one or more mediums located in one or more hardware devices. Further, although the example program is described with reference to the flowchart illustrated in FIGS. 3A-3B, many other methods of implementing the example CO2 monitoring circuitry 114 can alternatively be used. For example, the order of execution of the blocks can be changed, and/or some of the blocks described can be changed, eliminated, or combined. Additionally or alternatively, any or all of the blocks can be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry can be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein can be stored in one or more of a compressed format, an encrypted format, a fragmented format, a compiled format, an executable format, a packaged format, etc. Machine readable instructions as described herein can be stored as data or a data structure (e.g., as portions of instructions, code, representations of code, etc.) that can be utilized to create, manufacture, and/or produce machine executable instructions. For example, the machine readable instructions can be fragmented and stored on one or more storage devices and/or computing devices (e.g., servers) located at the same or different locations of a network or collection of networks (e.g., in the cloud, in edge devices, etc.). The machine readable instructions can require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions can be stored in multiple parts, which are individually compressed, encrypted, and/or stored on separate computing devices, wherein the parts when decrypted, decompressed, and/or combined form a set of machine executable instructions that implement one or more operations that can together form a program such as that described herein.

In another example, the machine readable instructions can be stored in a state in which they can be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions can need to be configured (e.g., settings stored, data input, network addresses recorded, etc.) before the machine readable instructions and/or the corresponding program(s) can be executed in whole or in part. Thus, machine readable media, as used herein, can include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions can be represented using any of the following languages: C, C++, Java, C#, Perl, Python, JavaScript, HyperText Markup Language (HTML), Structured Query Language (SQL), Swift, etc.

As mentioned above, the example operations of FIGS. 3A-3B can be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., can be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions can be implemented by, e.g., the same entity or object. Additionally, although individual features can be included in different examples or claims, these can possibly be combined, and the inclusion in different examples or claims does not imply that a combination of features is not feasible and/or advantageous.

FIGS. 3A-3B illustrate a flowchart representative of example machine readable instructions and/or example operations 300 that can be executed and/or instantiated by processor circuitry to track CO2 levels (or any other gas) in a close loop system. Although, FIGS. 3A-3B are described in conjunction with CO2, FIGS. 3A-3B can be described in conjunction with any chemical compound. Additionally, the flowchart of FIG. 3A-3B may be described in conjunction with a dynamic model (e.g., at the start of use of the turbine engine system 100) or in conjunction with an NPSS model (e.g., during use of the turbine engine system 100 after the dynamic model determined initial mass information). The machine readable instructions and/or the operations 300 of FIGS. 3A-3B begin at block 302, at which the interface circuitry 200 obtains data from the sensor(s) 110 and/or the system processing circuitry 112. The data can include flow rate data, temperature data, pressure data, density data, Qin, Qloss, initial mass of CO2 information, change of mass of CO2 from previous cycles, total volume of the system where the CO2 is housed, time taken to reach operating condition from start, ambient conditions, etc. In some examples, the sensor(s) 110 capture flow rate data from a portion of the CO2 loop, the temperature data from the CO2 system 109 and/or any other location of the turbine engine system 100, pressure data from the CO2 system 109, the density data from the one or more components of the CO2 system 109, the Qin and Qloss based on a lookup table, the initial mass of CO2 information, the change of mass of CO2, and the total volume of the system from a storage device that stores such information, the time taken to reach operating condition from a timer, and ambient conditions from various locations of the turbine engine system 100. In some examples, the flow rate data is assumed and/or calculated (e.g., based on (a) pump speed versus pressure and temperature into the pump, (b) orifice sizes versus pressure delta, etc.).

At block 304, the state model circuitry 202 generates a thermodynamic state model. For example, the state model circuitry 202 can generate the model corresponding to the above Equation 1 and/or any other thermodynamic state model. For example, the state model circuitry 202 can select and output a thermodynamic state stored in local storage.

At block 306, the state model circuitry 202 uses the temperature and/or pressure information corresponding to the CO2 (e.g., from the sensors 110 and/or system processing circuitry 112) to determine the state of the CO2 (e.g., gas, liquid, supercritical, etc.). In some examples, the state model circuitry 202 identifies the state using a lookup table based on the temperature and/or pressure. For example, the lookup table may correspond different temperatures and/or pressures to different states of CO2. In this manner, the state model circuitry 202 can identify the sCO2 state using the obtained temperature and/or pressure measurement in the table that links pressures and/or temperatures to CO2 state. The state of the CO2 can be included in an alert and/or output to the user interface 116.

At block 308, the state model circuitry 202 determines constants corresponding to the CO2 (e.g., that are to be used in the thermodynamic state model) and/or the Qlatent_heat based on the determined state. For example, the state model circuitry 202 uses the above-Equations 2-7 to determine the constants and determines the Qlatent_heat using a lookup table that links Qlatent_heat values to CO2 states. For example, if the CO2 is at 5.11 atmospheric pressure and −69.9 degrees F., the Qlatent heat vaporization will be a predefined value (149.6 Btu/lb).

At block 310, the non-linear solver circuitry 206 applies the temperature, pressure, CO2 constants, and a volume estimate to the thermodynamic model to generate a residual. For example, the non-linear solver circuitry 206 generates a volume estimate and applies the estimate and the values to the above-Equation 8 to generate a residual.

At block 312, the example non-linear solver circuitry 206 determines if the residual is less than a tolerance threshold. If the non-linear solver circuitry 206 determines that the residual is not less than the tolerance threshold (block 312: NO), then the non-linear solver circuitry 206 adjusts the volume estimate for CO2 (block 314), and control returns to block 310 for another iteration. For example, the non-linear solver circuitry 206 may increase the volume estimate or decrease the volume estimate. In some examples, the non-linear solver circuitry 206 adjusts the volume estimate based on how far away the residual is from the threshold. If the non-linear solver circuitry 206 determines that the residual is less than the tolerance threshold (block 312: YES), then the example non-linear solver circuitry 206 outputs the volume estimate to the example optimization circuitry 210 (block 316). For example, the non-linear solver circuitry 206 utilizes the volume estimate that corresponds to a residual that satisfies the threshold.

At block 318, the non-linear solver circuitry 206 determines the mass of the CO2 based on the volume estimate and the absolute volume of the container(s) that holds the CO2 (e.g., one or more components (pipes, valves, heat exchangers, pumps, etc.) of the CO2 system 109). For example, the non-linear solver circuitry 206 divides the absolute volume by the volume estimate to determine the mass of CO2. For example, if the absolute volume of the CO2 system and/or container(s) is 50 in^3 and the output volume estimate is 16.7 in^3/unit mass, then the non-linear solver circuitry 206 determines the mass of the CO2 to be 3 lbm (e.g., 50 in^3/16.7 in^3).

At block 320, the mass model circuitry 208 generates a system of equations corresponding to the mass loss/leakage of CO2. For example, the mass model circuitry 208 can generate the above Equations 9 and 10 that correspond to the mass loss of CO2. The mass model circuitry 208 provides the system of equations to the example optimization circuitry 210. In this manner, the optimization circuitry 210 can plug in values into the system of equations to solve for a mass loss estimate (mloss).

At block 322, the optimization circuitry 210 selects a mass loss estimate (mloss). For example, the optimization circuitry 210 may select a mass loss estimate of zero (or another value).

At block 324 of FIG. 3B, the optimization circuitry 210 applies the temperature, output voltage, energy values (Qin, Qloss, Qlatent_heat), mass of CO2 and mass loss estimate to the system of equations to generate a residual.

At block 326, the optimization circuitry 210 determines if the residual is less than the tolerance threshold. If the example optimization circuitry 210 determines that the residual is not less than the tolerance threshold (block 326: NO), then the optimization circuitry 210 adjusts the mass loss estimate (block 328), and control returns to block 324 to perform an additional iteration to reduce the residual. For example, the optimization circuitry 210 can adjust the mass loss (e.g., from zero to some value) and apply the adjusted mass loss to the system of equations to perform a subsequent iteration based on the adjusted mass loss value in an attempt to reduce the residual.

If the example optimization circuitry 210 determines that the residual is less than the tolerance threshold (block 326: YES), then the optimization circuitry 210 outputs the determined CO2 information (block 330). The determined CO2 information includes the determined mass loss that corresponds to a residual that satisfies the tolerance threshold. The determined CO2 information can further include the amount of change in CO2 mass from the initial mass, the differential of mass with respect to time, the differential of pressure with respect to time, the differential of temperature with respect to time, a time constant, and/or a rate of mass loss, any one of which can be determined by the optimization circuitry 210, as further described above in conjunction with FIG. 2.

At block 332, the comparator circuitry 212 determines if one or more parts of the CO2 information satisfies one or more thresholds. For example, the comparator circuitry 212 can compare the time constant to one or more time constant thresholds, the mass loss to one or more mass loss thresholds, etc. Examples of different thresholds or combination of thresholds may correspond to mass, mass loss, volume, rate of mass loss, rate of volume loss, temperature change, pressure change, time constants, pump speed, rate of leakage, etc. In some examples, a first threshold corresponds to a minor mass loss (e.g., a mass loss/leakage of less than 25%) and a second threshold corresponds to a more severe mass loss (e.g., a mass loss of more than 50%).

If the comparator circuitry 212 determines that one or more parts of the CO2 information satisfies the one or more thresholds (block 322: YES), then control continues to block 336. If the comparator circuitry 212 determines that one or more parts of the CO2 information does not satisfy the one or more thresholds (block 322: NO), then the example alert generation circuitry 214 generates an alert (block 334). The alert can be based on which level of threshold was not satisfied. As further described above, the alert generation circuitry 214 can transmit and/or send the alert to the user interface 116 to output the alert to a pilot, maintenance person (using a maintenance computing device), and/or another external device. For example, if the CO2 information does not satisfy a first threshold associated with a minor amount of CO2 leakage, the alert may be a sound and/or display that warns the pilot (e.g., in a user interface in the cockpit) and/or a maintenance person (e.g., in a user interface of a device used during maintenance of the turbine engine system 100) that the CO2 has leaked from the closed loop system. The alert may indicate how much CO2 has leaked, how long (e.g., time or flights) before too much CO2 is leaked for proper and/or effective use of the CO2, the state of the CO2 etc.

At block 336, the component control circuitry 216 adjusts the engine components 102. In some examples, the component control circuitry 216 can adjust the engine components 102 based on a particular threshold(s) not being satisfied. For example, the component control circuitry 216 can avoid adjusting the engine components 102 when there is a minor CO2 leak that corresponds to a first threshold, but can adjust engine components 102 when there is a major CO2 leak that corresponds to a second threshold. The example component control circuitry 216 can adjust the engine components 102 by disabling use of the CO2 system 109 and/or diverting the heat flow by adjusting the heat exchangers 104 and/or valves 108. For example, the component control circuitry 216 can cause the valves to move from a first position to a second position to divert heat from one part of the turbine engine system 100 to another part of the turbine engine system 100 and/or disable and/or enable heat exchangers 104.

At block 338, the optimization circuitry 210 determines if a previous mass loss of CO2 was determined. Even if the mass loss/leakage is acceptable, if the rate of mass loss/leakage is above a threshold, the mass loss/leakage can result in a problem quickly. For example, if the leakage of the CO2 corresponds to only a 2% leakage, but the 2% leakage occurred in less than a minute. The 2% leakage of CO2 may not cause any issues in use of the CO2, but the rate of leakage (e.g., 2% per minute) will result in massive leakage in 30 minutes (e.g., 60% leakage in 30 minutes). Accordingly, the CO2 monitoring circuitry 114 tracks the rate of leakage based on the current leakage and a previous leakage. For example, the CO2 monitoring circuitry 114 may determine the rate of leakage based on a ratio of (a) a difference between the current leakage and a previous leakage and (b) a time difference between when the current leakage was determined and when the previous leakage was determined. In some examples, the CO2 monitoring circuitry 114 generates a function of leakage with respect to time based on the current leakage and two or more previous leakages (e.g., to determine a non-linear leakage with respect to time). If the optimization circuitry 210 determines that a previous leakage of CO2 has not been determined (block 338: NO), then the instructions and/or operations end. If the optimization circuitry 210 determines that a previous mass loss of CO2 has been determined (block 338: YES), then the optimization circuitry 210 determines a rate of mass loss based on the current mass loss and a previous mass loss (block 340). In some examples, the optimization circuitry 210 can project the CO2 mass based on the current CO2 mass and the rate of mass loss to determine when the CO2 mass will generate an alert, require maintenance, and/or determine the severity of the CO2 leakage. Any of the determined information can be output to the user interface 116 for output to a pilot, maintenance, and/or any other person or device. For example, the determined information may be displayed to a pilot on a user interface in the cockpit, transmitted to a user interface in a control center, and/or displayed on a maintenance device during maintenance.

At block 342, the comparator circuitry 212 determines if the rate of mass loss satisfies one or more thresholds. In some examples, a first threshold corresponds to a minor mass loss (e.g., 0.125% per 5 hours) and a second threshold corresponds to a more severe mass loss (e.g., 0.5% per 5 hours). If the comparator circuitry 212 determines that the rate of mass loss satisfies the one or more thresholds (block 342: YES), the instructions and/or operations end. The thresholds may be dependent on the type of turbine engine system. If the example comparator circuitry 212 determines that the rate of mass loss does not satisfy the one or more thresholds (block 342: NO), the example alert generation circuitry 214 generates an alert (block 344). The alert can be based on which level of threshold was not satisfied. As further described above, the alert generation circuitry 214 can transmit and/or send the alert to the user interface 116 to output the alert to a pilot, maintenance person (using a maintenance computing device), and/or an external device in a control center.

At block 346, the component control circuitry 216 adjusts the engine components 102. In some examples, the component control circuitry 216 can adjust the engine components 102 based on particular threshold(s) not being satisfied. For example, the component control circuitry 216 can avoid adjusting the engine components 102 when the rate of mass loss is minor (e.g., does not satisfy a first threshold but satisfies a second threshold), but can adjust engine components 102 when the rate of mass loss is major (e.g., does not satisfy both the first and second thresholds). The example component control circuitry 216 can adjust the engine components 102 by disabling use of the CO2 system 109 and/or diverting the heat flow by adjusting the flows to the heat exchangers 104 and/or valves 108. For example, when the rate of mass loss satisfies a first and second threshold (e.g., the rate of mass loss is zero or nearly zero) and/or a second threshold but not the first threshold (e.g., the rate of mass loss is less than 0.5% per 5 hours), the component control circuitry 216 determines that there is sufficient CO2 to operate the CO2 system 109 Thus, the component control circuitry 216 keeps the CO2 system 109 enabled for use and keeps the configuration of the heat exchangers 104 and/or valves 108 to allow heat to be diverted toward CO2 system 109 to allow heat to be exchanged to use the CO2 system 109 efficiently. However, when the rate of mass loss does not satisfy the first and second threshold (e.g., the rate of mass loss is more than 0.125% per 5 hours and the rate of mass loss is more than 0.5% per 5 hour), the component control circuitry 216 determines that there is not or will not be sufficient CO2 to operate the CO2 system 109. Thus, the component control circuitry 216 disables use of the CO2 system 109 and configures one or more of the heat exchangers 104 (e.g., to enable or disable) and/or valves 108 (e.g., to move from a first position to a second position) to allow heat to be diverted from the CO2 system 109 to another component (e.g., to increase efficiency of the other component). After block 346, the instructions and/or operations end.

Although blocks 338-346 correspond to a rate or trend of mass loss as depicted in FIG. 3B, blocks 338-346 may also correspond to an analysis of trends with respect to density, volume, and/or temperature in other embodiments without departing from the scope of the present disclosure. Additionally, as described above, the trend analysis can be implemented by the example AI-based model circuitry 218 of FIG. 2. For example, an AI-based model can be used to compare sensor inputs accounting ambient conditions with an acceptable trend database 220 and provide deviation from trends that can correspond in alerts and/or reconfiguring of the engine components 102, as further described above in conjunction with FIG. 2.

Figure 4:
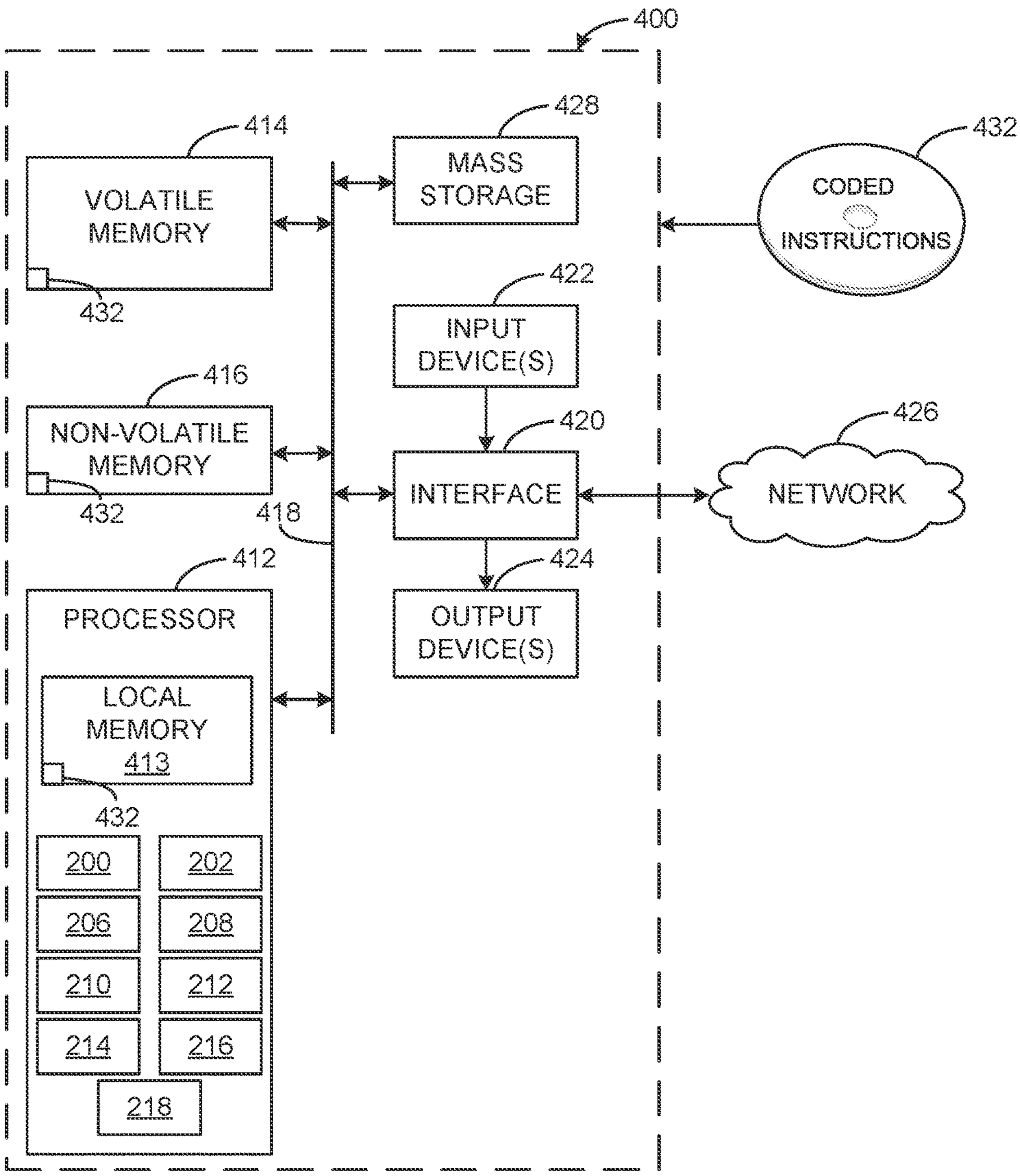
FIG. 4 is a block diagram of an example processing platform including processor circuitry structured to execute the example machine readable instruction and/or example operations of FIGS. 3A-3B to implement the example carbon dioxide monitoring circuitry of FIG. 2.

FIG. 4 is a block diagram of an example processor platform 400 structured to execute and/or instantiate the machine readable instructions and/or the operations of FIGS. 3A-3B to implement the CO2 monitoring circuitry 114 of FIG. 2. The processor platform 400 can be, for example, a server, a personal computer, a workstation, a self-learning machine (e.g., a neural network), an Internet appliance, or any other type of computing device.

The processor platform 400 of the illustrated example includes processor circuitry 412. The processor circuitry 412 of the illustrated example is hardware. For example, the processor circuitry 412 can be implemented by one or more integrated circuits, logic circuits, FPGAs, microprocessors, CPUs, GPUs, DSPs, and/or microcontrollers from any desired family or manufacturer. The processor circuitry 412 can be implemented by one or more semiconductor based (e.g., silicon based) devices. In this example, the processor circuitry 412 implements the example interface circuitry 200, the example state model circuitry 202, the example non-linear solver circuitry 206, the example mass model circuitry 208, the example optimization circuitry 210, the example comparator circuitry 212, the example alert generation circuitry 214, the example component control circuitry 216, and/or the example AI-based model circuitry 218 of FIG. 2.

The processor circuitry 412 of the illustrated example includes a local memory 413 (e.g., a cache, registers, etc.). The processor circuitry 412 of the illustrated example is in communication with a main memory including a volatile memory 414 and a non-volatile memory 416 by a bus 418. The volatile memory 414 can be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 416 can be implemented by flash memory and/or any other desired type of memory device. Access to the main memory 414, 416 of the illustrated example is controlled by a memory controller. Any one of the volatile memory 414, the non-volatile memory 416, the local memory 413, and/or the mass storage devices 428 can implement the trend database 220 of FIG. 2.

The processor platform 400 of the illustrated example also includes interface circuitry 420. The interface circuitry 420 can be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 422 are connected to the interface circuitry 420. The input device(s) 422 permit(s) a user to enter data and/or commands into the processor circuitry 412. The input device(s) 422 can be implemented by, for example, sensor(s), an audio sensor, a microphone, a camera (still or video), etc.

One or more output devices 424 are also connected to the interface circuitry 420 of the illustrated example. The output device(s) 424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), external computing devices, a tactile output device, a printer, and/or speaker. The interface circuitry 420 of the illustrated example, thus, typically includes a graphics driver card, a graphics driver chip, and/or graphics processor circuitry such as a GPU.

The interface circuitry 420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 426. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 400 of the illustrated example also includes one or more mass storage devices 428 to store software and/or data. Examples of such mass storage devices 428 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 432, which may be implemented by the machine readable instructions of FIGS. 3A-3B, may be stored in the mass storage device 428, in the volatile memory 414, in the non-volatile memory 416, and/or on a removable non-transitory computer readable storage medium such as a CD or DVD.

Figure 5:
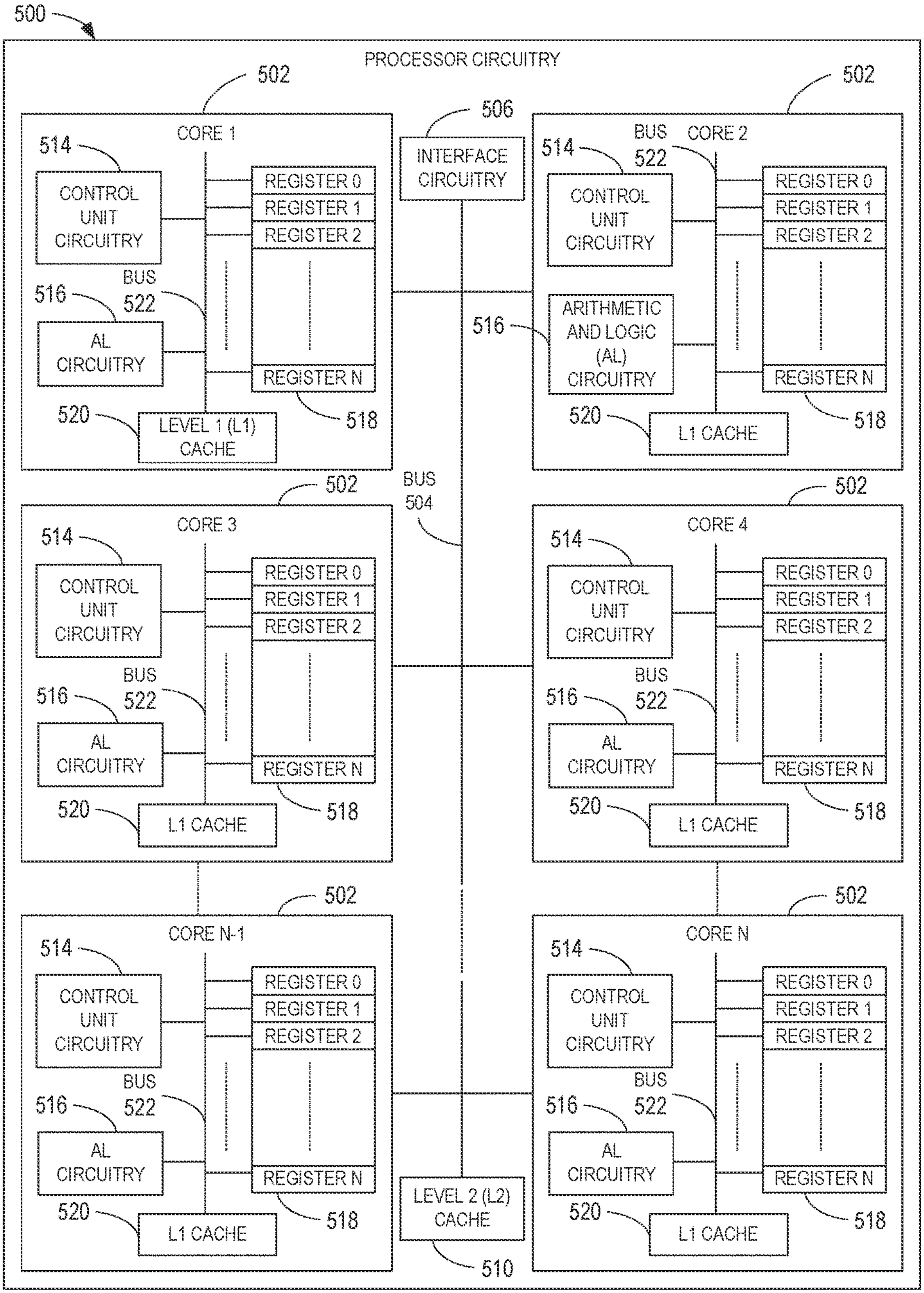
FIG. 5 is a block diagram of an example implementation of the processor circuitry of FIG. 4.

FIG. 5 is a block diagram of an example implementation of the processor circuitry 412 of FIG. 4. In this example, the processor circuitry 412 of FIG. 4 is implemented by a microprocessor 500. For example, the microprocessor 500 may be a general purpose microprocessor (e.g., general purpose microprocessor circuitry). The microprocessor 500 executes some or all of the machine readable instructions of the flowchart of FIGS. 3A-3B to effectively instantiate the CO2 monitoring circuitry 114 as logic circuits to perform the operations corresponding to those machine readable instructions. In some such examples, the CO2 monitoring circuitry 114 (e.g., the AI-based model circuitry 218) is instantiated by the hardware circuits of the microprocessor 500 in combination with the instructions. For example, the microprocessor 500 may be implemented by multi-core hardware circuitry such as a CPU, a DSP, a GPU, an XPU, etc. Although it may include any number of example cores 502 (e.g., 1 core), the microprocessor 500 of this example is a multi-core semiconductor device including N cores. The cores 502 of the microprocessor 500 may operate independently or may cooperate to execute machine readable instructions. For example, machine code corresponding to a firmware program, an embedded software program, or a software program may be executed by one of the cores 502 or may be executed by multiple ones of the cores 502 at the same or different times. In some examples, the machine code corresponding to the firmware program, the embedded software program, or the software program is split into threads and executed in parallel by two or more of the cores 502. The software program may correspond to a portion or all of the machine readable instructions and/or operations represented by the flowchart of FIGS. 3A-3B.

The cores 502 may communicate by an example first bus 504. In some examples, the first bus 504 may be implemented by a communication bus to effectuate communication associated with one(s) of the cores 502. For example, the first bus 504 may be implemented by at least one of an Inter-Integrated Circuit (I2C) bus, a Serial Peripheral Interface (SPI) bus, a PCI bus, or a PCIe bus. Additionally or alternatively, the first bus 504 may be implemented by any other type of computing or electrical bus. The cores 502 may obtain data, instructions, and/or signals from one or more external devices by example interface circuitry 506. The cores 502 may output data, instructions, and/or signals to the one or more external devices by the interface circuitry 506. For example, the cores 502 may obtain sensor information from the sensor 110 and/or the system processing circuitry 112 of FIG. 1. Although the cores 502 of this example include example local memory 520 (e.g., Level 1 (L1) cache that may be split into an L1 data cache and an L1 instruction cache), the microprocessor 500 also includes example shared memory 510 that may be shared by the cores (e.g., Level 2 (L2) cache) for high-speed access to data and/or instructions. Data and/or instructions may be transferred (e.g., shared) by writing to and/or reading from the shared memory 510. The local memory 520 of each of the cores 502 and the shared memory 510 may be part of a hierarchy of storage devices including multiple levels of cache memory and the main memory (e.g., the main memory 414, 416 of FIG. 4). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 502 may be referred to as a CPU, DSP, GPU, etc., or any other type of hardware circuitry. Each core 502 includes control unit circuitry 514, arithmetic and logic (AL) circuitry (sometimes referred to as an ALU) 516, a plurality of registers 518, the local memory 520, and an example second bus 522. Other structures may be present. For example, each core 502 may include vector unit circuitry, single instruction multiple data (SIMD) unit circuitry, load/store unit (LSU) circuitry, branch/jump unit circuitry, floating-point unit (FPU) circuitry, etc. The control unit circuitry 514 includes semiconductor-based circuits structured to control (e.g., coordinate) data movement within the corresponding core 502. The AL circuitry 516 includes semiconductor-based circuits structured to perform one or more mathematic and/or logic operations on the data within the corresponding core 502. The AL circuitry 516 of some examples performs integer based operations. In other examples, the AL circuitry 516 also performs floating point operations. In yet other examples, the AL circuitry 516 may include first AL circuitry that performs integer based operations and second AL circuitry that performs floating point operations. In some examples, the AL circuitry 516 may be referred to as an Arithmetic Logic Unit (ALU). The registers 518 are semiconductor-based structures to store data and/or instructions such as results of one or more of the operations performed by the AL circuitry 516 of the corresponding core 502. For example, the registers 518 may include vector register(s), SIMD register(s), general purpose register(s), flag register(s), segment register(s), machine specific register(s), instruction pointer register(s), control register(s), debug register(s), memory management register(s), machine check register(s), etc. The registers 518 may be arranged in a bank as shown in FIG. 5. Alternatively, the registers 518 may be organized in any other arrangement, format, or structure including distributed throughout the core 502 to shorten access time. The second bus 522 may be implemented by at least one of an I2C bus, a SPI bus, a PCI bus, or a PCIe bus.

Each core 502 and/or, more generally, the microprocessor 500 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 500 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 6:
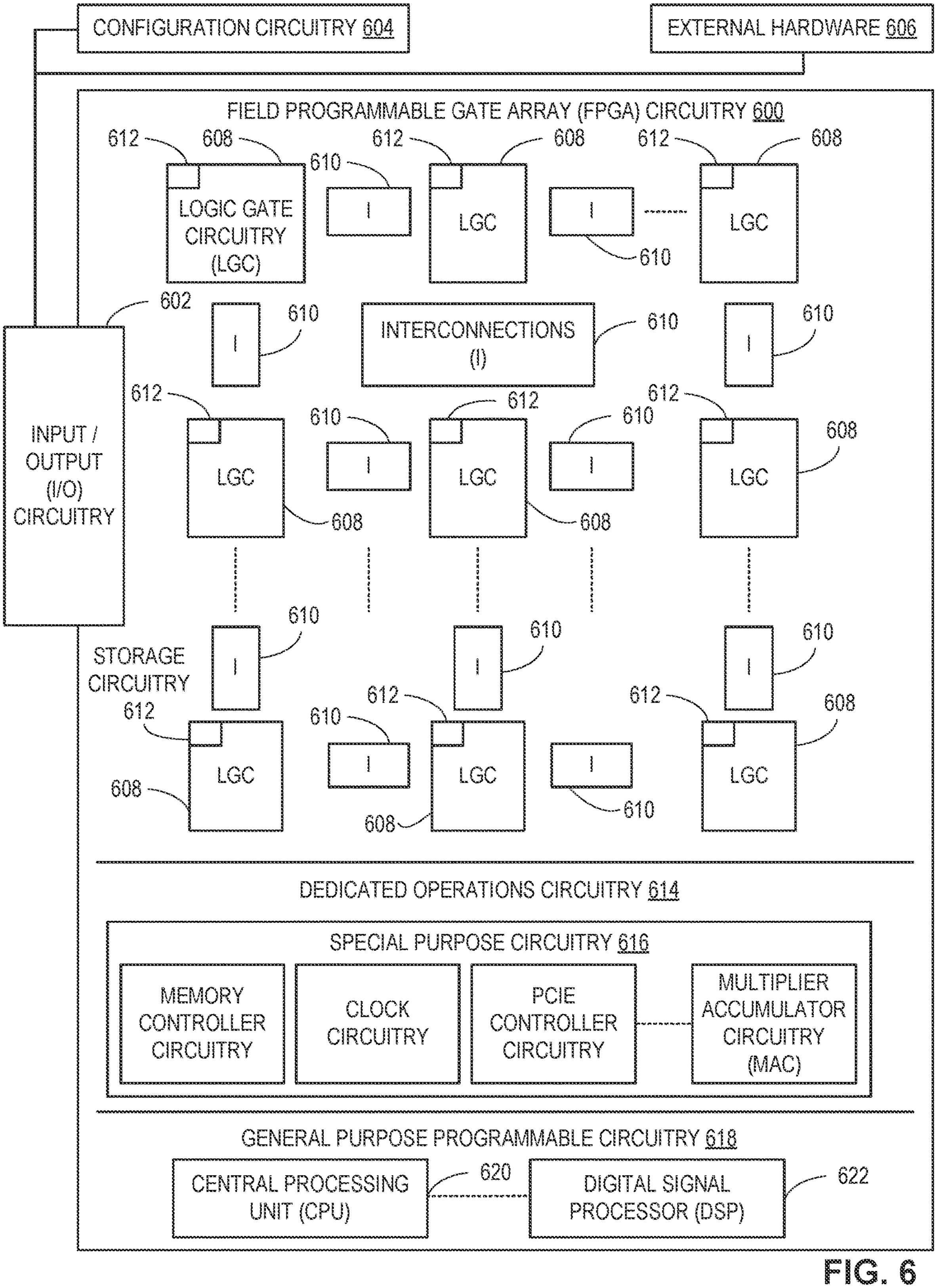
FIG. 6 is a block diagram of another example implementation of the processor circuitry of FIG. 4.

FIG. 6 is a block diagram of another example implementation of the processor circuitry 412 of FIG. 4. In this example, the processor circuitry 412 is implemented by FPGA circuitry 600. For example, the FPGA circuitry 600 may be implemented by an FPGA. The FPGA circuitry 600 can be used, for example, to perform operations that could otherwise be performed by the example microprocessor 500 of FIG. 5 executing corresponding machine readable instructions. However, once configured, the FPGA circuitry 600 instantiates the machine readable instructions in hardware and, thus, can often execute the operations faster than they could be performed by a general purpose microprocessor executing the corresponding software.

More specifically, in contrast to the microprocessor 500 of FIG. 5 described above (which is a general purpose device that may be programmed to execute some or all of the machine readable instructions represented by the flowchart of FIGS. 3A-3B but whose interconnections and logic circuitry are fixed once fabricated), the FPGA circuitry 600 of the example of FIG. 6 includes interconnections and logic circuitry that may be configured and/or interconnected in different ways after fabrication to instantiate, for example, some or all of the machine readable instructions represented by the flowchart of FIGS. 3A-3B. In particular, the FPGA circuitry 600 may be thought of as an array of logic gates, interconnections, and switches. The switches can be programmed to change how the logic gates are interconnected by the interconnections, effectively forming one or more dedicated logic circuits (unless and until the FPGA circuitry 600 is reprogrammed). The configured logic circuits enable the logic gates to cooperate in different ways to perform different operations on data received by input circuitry. Those operations may correspond to some or all of the software represented by the flowchart of FIGS. 3A-3B. As such, the FPGA circuitry 600 may be structured to effectively instantiate some or all of the machine readable instructions of the flowchart of FIGS. 3A-3B as dedicated logic circuits to perform the operations corresponding to those software instructions in a dedicated manner analogous to an ASIC. Therefore, the FPGA circuitry 600 may perform the operations corresponding to the some or all of the machine readable instructions of FIGS. 3A-3B faster than the general purpose microprocessor can execute the same.

In the example of FIG. 6, the FPGA circuitry 600 is structured to be programmed (and/or reprogrammed one or more times) by an end user by a hardware description language (HDL) such as Verilog. The FPGA circuitry 600 of FIG. 6, includes example input/output (I/O) circuitry 602 to obtain and/or output data to/from example configuration circuitry 604 and/or external hardware 606. For example, the example input/output (I/O) circuitry 602 may obtain sensor information from the sensor 110 and/or the system processing circuitry 112 of FIG. 1. For example, the configuration circuitry 604 may be implemented by interface circuitry that may obtain machine readable instructions to configure the FPGA circuitry 600, or portion(s) thereof. In some such examples, the configuration circuitry 604 may obtain the machine readable instructions from a user, a machine (e.g., hardware circuitry (e.g., programmed or dedicated circuitry) that may implement an Artificial Intelligence/Machine Learning (AI/ML) model (e.g., the AI-based model circuitry 218 of FIG. 2) to generate the instructions), etc. In some examples, the external hardware 606 may be implemented by external hardware circuitry. For example, the external hardware 606 may be implemented by the microprocessor 500 of FIG. 5. The FPGA circuitry 600 also includes an array of example logic gate circuitry 608, a plurality of example configurable interconnections 610, and example storage circuitry 612. The logic gate circuitry 608 and the configurable interconnections 610 are configurable to instantiate one or more operations that may correspond to at least some of the machine readable instructions of FIGS. 3A-3B and/or other desired operations. The logic gate circuitry 608 shown in FIG. 6 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 608 to enable configuration of the electrical structures and/or the logic gates to form circuits to perform desired operations. The logic gate circuitry 608 may include other electrical structures such as look-up tables (LUTs), registers (e.g., flip-flops or latches), multiplexers, etc.

The configurable interconnections 610 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 608 to program desired logic circuits.

The storage circuitry 612 of the illustrated example is structured to store result(s) of the one or more of the operations performed by corresponding logic gates. The storage circuitry 612 may be implemented by registers or the like. In the illustrated example, the storage circuitry 612 is distributed amongst the logic gate circuitry 608 to facilitate access and increase execution speed.

The example FPGA circuitry 600 of FIG. 6 also includes example Dedicated Operations Circuitry 614. In this example, the Dedicated Operations Circuitry 614 includes special purpose circuitry 616 that may be invoked to implement commonly used functions to avoid the need to program those functions in the field. Examples of such special purpose circuitry 616 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 600 may also include example general purpose programmable circuitry 618 such as an example CPU 620 and/or an example DSP 622. Other general purpose programmable circuitry 618 may additionally or alternatively be present such as a GPU, an XPU, etc., that can be programmed to perform other operations.

Although FIGS. 5 and 6 illustrate two example implementations of the processor circuitry 412 of FIG. 4, many other approaches are contemplated. For example, as mentioned above, modern FPGA circuitry may include an on-board CPU, such as one or more of the example CPU 620 of FIG. 6. Therefore, the processor circuitry 412 of FIG. 4 may additionally be implemented by combining the example microprocessor 500 of FIG. 5 and the example FPGA circuitry 600 of FIG. 6. In some such hybrid examples, a first portion of the machine readable instructions represented by the flowchart of FIGS. 3A-3B may be executed by one or more of the cores 502 of FIG. 5, a second portion of the machine readable instructions represented by the flowchart of FIGS. 3A-3B may be executed by the FPGA circuitry 600 of FIG. 6, and/or a third portion of the machine readable instructions represented by the flowchart of FIGS. 3A-3B may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 412 of FIG. 4 may be in one or more packages. For example, the microprocessor 500 of FIG. 5 and/or the FPGA circuitry 600 of FIG. 6 may be in one or more packages. In some examples, an XPU may be implemented by the processor circuitry 412 of FIG. 4, which may be in one or more packages. For example, the XPU may include a CPU in one package, a DSP in another package, a GPU in yet another package, and an FPGA in still yet another package.

From the foregoing, it will be appreciated that example methods, apparatus and articles of manufacture have been disclosed that monitor health of a closed loop system in a turbine engine using a physics-based model. In some turbine engine designs, the system, pilot, and/or maintenance will not be aware of a CO2 leak. Accordingly, if the pilot attempts to enable the CO2 system 109 for usage during flight, they will not be aware of whether the CO2 system 109 is operating as intended or not, which can be dangerous if the pilot is depending on the proper functionality, but there is not enough CO2 to properly function. Additionally, a maintenance person cannot automatically determine if the CO2 level is low and would need to disassemble at least a portion of the turbine engine to verify the CO2 level. Additionally, because such turbine engines cannot determine CO2 leaks, when a CO2 leak occurs, such turbine engines will continue to load heat onto or off of the CO2 system, but no heat will be available to transfer, which can lead to an inefficient or dangerous situation. Thus, such turbine engines correspond to inefficient routing of heat.

The disclosed examples are able to identify leaks of gas in closed loop systems without adding additional hardware. In this manner, examples disclosed herein identify and mitigate issues related to gas leaks without the cost or complexity of other systems. Additionally, examples disclosed herein are able keep flights safe by identifying minor and/or major leaks to a pilot and/or a maintenance person and identify when maintenance will be required. When a leak is above a threshold amount of leak, examples disclosed herein prevent the corresponding component (e.g., pump) from use. Additionally, examples disclosed herein can reroute heat from the corresponding component to another component to increase efficiency of the other component. Accordingly, disclosed systems, methods, apparatus, and articles of manufacture are accordingly directed to one or more improvement(s) in the operation of a machine such as a computer or other electronic and/or mechanical device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Further aspects of the disclosure are provided by the subject matter of the following clauses:

Example methods, apparatus, systems, and articles of manufacture to monitor health of a closed loop system in a turbine engine are disclosed herein. Further examples and combinations thereof include the following: Example 1 includes an apparatus comprising non-linear solver circuitry to iteratively determine a volume of a chemical compound in a system and/or loop of a turbine engine based on a pressure measurement, a temperature measurement, and a constant that corresponds to a thermodynamic state, the non-linear solver circuitry to iteratively determine the volume of the chemical compound using a thermodynamic state model, and determine a mass of the chemical compound based on the volume of the chemical compound and a volume of system, optimization circuitry to iteratively determine a mass loss of the chemical compound based on the mass of the chemical compound using a system of equations, and component control circuitry to adjust use of the system of the chemical compound based on the mass loss of the chemical compound.

Example 2 includes the apparatus of example 1, further including alert generation circuitry to output an alert based on the mass loss of the chemical compound.

Example 3 includes the apparatus of example 2, wherein the alert generation circuitry is to generate the alert based on a degree of the mass loss of the chemical compound.

Example 4 includes the apparatus of example 1, wherein the chemical compound is carbon dioxide.

Example 5 includes the apparatus of example 1, wherein the non-linear solver circuitry is to iteratively determine the volume of the gas in the system by selecting a volume estimate, applying the volume estimate, the pressure measurement, the temperature measurement, and the constant to the thermodynamic state model to generate a residual, if the residual does not satisfy a threshold adjusting the volume estimate, and performing an additional iteration, and when the residual satisfies the threshold, outputting the volume estimate as the volume of the chemical compound.

Example 6 includes the apparatus of example 1, further including state model circuitry to determine the state of the chemical compound, the state including at least one of a gas or a supercritical state.

Example 7 includes the apparatus of example 1, wherein the system of equations corresponds to a derivative of mass with respect to time, the temperature measurement, input thermal energy, thermal energy loss, and latent heat, the latent heat corresponding to the thermodynamic state.

Example 8 includes the apparatus of example 1, wherein the optimization circuitry is to determine a thermal time constant based on the mass loss.

Example 9 includes the apparatus of example 8, wherein the component control circuitry is to disable the use of the system of the chemical compound based on a comparison of the thermal time constant to a threshold.

Example 10 includes the apparatus of example 1, wherein the optimization circuitry is to determine a trend based on the mass loss and a previous mass loss.

Example 11 includes the apparatus of example 10, wherein the component control circuitry is to disable the use of the system of the chemical compound based on a comparison of the trend to a threshold.

Example 12 includes the apparatus of example 1, wherein the component control circuitry is to adjust components of the turbine engine to reroute heat in the turbine engine based on the mass loss of the chemical compound.

Example 13 includes the apparatus of claim 1, wherein optimization circuitry to iteratively determine a mass loss of the chemical compound based on at least one of the temperature measurement, the pressure measurement, or a flow rate measurement.

Example 14 includes a non-transitory computer readable medium comprising instructions which, when executed, cause processor circuitry to at least iteratively determine a volume of a chemical compound in a system of a turbine engine based on a pressure measurement using a thermodynamic state model, a temperature measurement, and a constant that corresponds to a thermodynamic state, determine a mass of the chemical compound based on the volume of the chemical compound and a volume of system, iteratively determine a mass loss of the chemical compound based on the mass of the chemical compound using a system of equations, and adjust use of the system of the chemical compound based on the mass loss of the chemical compound.

Example 15 includes the computer readable medium of example 14, wherein the instructions cause the processor circuitry to cause output an alert based on the mass loss of the chemical compound.

Example 16 includes the computer readable medium of example 14, wherein the instructions cause the processor circuitry to iteratively determine the volume of the chemical compound in the system by selecting a volume estimate, applying the volume estimate, the pressure measurement, the temperature measurement, and the constant to the thermodynamic state model to generate a residual, if the residual does not satisfy a threshold adjusting the volume estimate, and performing an additional iteration, and when the residual satisfies the threshold, outputting the volume estimate as the volume of the chemical compound.

Example 17 includes the computer readable medium of example 14, wherein the instructions cause the processor circuitry to determine the state of the chemical compound, the state including at least one of a gas or a supercritical state.

Example 18 includes the computer readable medium of example 14, wherein the system of equations corresponds to a derivative of mass with respect to time, the temperature measurement, input thermal energy, thermal energy loss, and latent heat, the latent heat corresponding to the thermodynamic state.

Example 19 includes the computer readable medium of example 14, wherein the instructions cause the processor circuitry to determine a thermal time constant based on the mass loss.

Example 20 includes the computer readable medium of example 19, wherein the instructions cause the processor circuitry to disable the use of the system of the chemical compound based on a comparison of the thermal time constant to a threshold.

Example 21 includes the computer readable medium of example 14, wherein the instructions cause the processor circuitry to determine a trend based on the mass loss and a previous mass loss.

Example 22 includes the computer readable medium of example 21, wherein the instructions cause the processor circuitry to disable the use of the system of the chemical compound based on a comparison of the trend to a threshold.

Example 23 includes the computer readable medium of claim 12, wherein the instructions cause the processor circuitry to determine the mass of the chemical compound based on vibration data sensed by a sensor.

Example 24 includes an apparatus comprising memory, computer readable instructions, and processor circuitry to execute the computer readable instructions to iteratively determine a volume of a chemical compound in a system of a turbine engine based on a pressure measurement using a thermodynamic state model, a temperature measurement, and a constant that corresponds to a thermodynamic state, determine a mass of the chemical compound based on the volume of the chemical compound and a volume of system, iteratively determine a mass loss of the chemical compound based on the mass of the chemical compound using a system of equations, and adjust use of the CO2 system and/or loop of the chemical compound based on the mass loss of the chemical compound.

Example 25 includes the apparatus of example 1, wherein the thermodynamic state model equates the pressure measurement to a first difference between (a) a first ratio of (i)

a first product of a gas constant and the temperature measurement and (ii) a second difference between a volume measurement and a first thermodynamic constant and (b) a second ratio of (i) a second product of a second thermodynamic constant and a third thermodynamic constant and (ii) a quadratic expression corresponding to the volume measurement and the first thermodynamic constant.

Example 26 includes the apparatus of example 25, wherein the first thermodynamic constant corresponds to a third ratio of (a) a third product of a second constant, the gas constant, and a first property of the chemical compound and (b) a second property of the gas constant.

Example 27 includes the apparatus of example 25, wherein the second thermodynamic constant corresponds to a third ratio of (a) a third product of a second constant, the gas constant squared, and a first property of the chemical compound squared and (b) a second property of the gas constant.

Example 28 includes the apparatus of example 25, wherein the third thermodynamic constant corresponds to a square of a sum of (a) one and (b) a third product of (i) a variable and (ii) a difference between one and a square root of a property of the chemical compound.

Example 29 includes the apparatus of example 28, wherein, when a second property of the chemical compound is below a threshold, the variable corresponds to a first constant plus a fourth product of (i) a second constant and (ii) the second property of the chemical compound minus a fifth product of (i) a third constant and (ii) the second property squared.

Example 30 includes the apparatus of example 28, wherein, when a second property of the chemical compound is above a threshold, the variable corresponds to a first constant plus a fourth product of (i) a second constant and (ii) the second property of the chemical compound minus a fifth product of (i) a third constant and (ii) the second property squared plus a sixth product of (i) a fourth constant and (ii) the second property cubed.

Example 31 includes the apparatus of example 28, wherein the property of the chemical compound corresponds to a third ratio of the temperature measurement to the property of the chemical compound.

Example 32 includes the apparatus of example 1, wherein the thermodynamic state model equates a residual to the pressure measurement minus a first difference between (a) a first ratio of (i) a first product of a gas constant and the temperature measurement and (ii) a second difference between a volume measurement and a first thermodynamic constant and (b) a second ratio of (i) a second product of a second thermodynamic constant and a third thermodynamic constant and (ii) a quadratic expression corresponding to the volume measurement and the first thermodynamic constant.

Example 33 includes the apparatus of example 1, wherein the system of equations includes an equation that equates a residual to the mass of the chemical compound minus an estimated mass loss of the chemical compound minus a derivative of the mass of the chemical compound over time.

Example 34 includes the apparatus of example 1, wherein the system of equations includes an equation that equates a derivative of the mass of the chemical compound over time to an input heat minus a heat loss plus a latent heat.

Example 35 includes the apparatus of example 1, further including AI-base model circuitry to execute a trend monitoring algorithm that compares sensor inputs corresponding to ambient conditions with an acceptable trend database.

Example 36 includes the apparatus of example 35, wherein AI-based model circuitry is to execute the trend monitoring algorithm to identify a deviation from a trend.

Example 37 includes the apparatus of example 36, wherein the component control circuitry is to adjust the use of the system of the chemical compound based on the deviation from the trend.

It is noted that this patent claims priority from Indian patent application Number 202311022527, which was filed on Mar. 28, 2023, and is hereby incorporated by reference in its entirety.

The following claims are hereby incorporated into this Detailed Description by this reference, with each claim standing on its own as a separate embodiment of the present disclosure.

What is claimed is:

1. An apparatus comprising:

non-linear solver circuitry to:

iteratively determine a volume of a chemical compound in a system of a turbine engine by:

applying a volume estimate, a pressure measurement, a temperature measurement, and a constant to a thermodynamic state model to generate a residual;

when the residual does not satisfy a threshold, adjusting the volume estimate and performing an additional iteration; and when the residual satisfies the threshold, outputting the volume estimate as the volume of the chemical compound; and determine a mass of the chemical compound based on the volume of the chemical compound and a volume of the system;

optimization circuitry to iteratively determine a mass loss of the chemical compound based on the mass of the chemical compound using a system of equations; and component control circuitry to i) adjust at least one of a position of a valve or a pump schedule of the system when the mass is below a first threshold and ii) disable the system when the mass is below a second threshold.

2. The apparatus of claim 1, further including alert generation circuitry to output an alert based on the mass loss of the chemical compound.

3. The apparatus of claim 1, further including state model circuitry to determine a state of the chemical compound, the state including at least one of a gas or a supercritical state.

4. The apparatus of claim 1, wherein the system of equations corresponds to a derivative of mass with respect to time, the temperature measurement, input thermal energy, thermal energy loss, and latent heat, the latent heat corresponding to a thermodynamic state.

5. The apparatus of claim 1, wherein the optimization circuitry is to determine a thermal time constant based on the mass loss.

6. The apparatus of claim 5, wherein the component control circuitry is to adjust use of the system of the chemical compound based on a comparison of the thermal time constant to a threshold.

7. The apparatus of claim 1, wherein the optimization circuitry is to determine a trend based on the mass loss and a previous mass loss.

8. The apparatus of claim 7, wherein the component control circuitry is to adjust use of the system of the chemical compound based on a comparison of the trend to a threshold.

9. The apparatus of claim 1, wherein the component control circuitry is to adjust components of the turbine engine to reroute heat in the turbine engine based on the mass loss of the chemical compound.

10. The apparatus of claim 1, wherein the optimization circuitry is to iteratively determine the mass loss of the chemical compound based on at least one of the temperature measurement, the pressure measurement, or a flow rate measurement.

11. A non-transitory computer readable medium comprising instructions which, when executed, cause processor circuitry to at least:

iteratively determine a volume of a chemical compound in a system of a turbine engine by:

applying a volume estimate, a pressure measurement, a temperature measurement, and a constant to a thermodynamic state model to generate a residual;

when the residual does not satisfy a threshold, adjusting the volume estimate and performing an additional iteration; and when the residual satisfies the threshold, outputting the volume estimate as the volume of the chemical compound;

determine a mass of the chemical compound based on the volume of the chemical compound and a volume of system;

iteratively determine a mass loss of the chemical compound based on the mass of the chemical compound using a system of equations;

adjust at least one of a position of a valve or a pump schedule of the system when the mass is below a first threshold; and disable the system when the mass is below a second threshold.

12. The computer readable medium of claim 11, wherein the instructions cause the processor circuitry to cause output an alert based on the mass loss of the chemical compound.

13. The computer readable medium of claim 11, wherein the instructions cause the processor circuitry to determine a state of the chemical compound, the state including at least one of a gas or a supercritical state.

14. The computer readable medium of claim 11, wherein the system of equations corresponds to a derivative of mass with respect to time, the temperature measurement, input thermal energy, thermal energy loss, and latent heat, the latent heat corresponding to a thermodynamic state.

15. The computer readable medium of claim 11, wherein the instructions cause the processor circuitry to determine a thermal time constant based on the mass loss.

16. The computer readable medium of claim 15, wherein the instructions cause the processor circuitry to adjust use of the system of the chemical compound based on a comparison of the thermal time constant to a threshold.

17. The computer readable medium of claim 11, wherein the instructions cause the processor circuitry to determine the mass of the chemical compound based on vibration data sensed by a sensor.

18. An apparatus comprising:

a non-transitory memory storing computer readable instructions thereon; and processor circuitry to execute the computer readable instructions to:

iteratively determine a volume of a chemical compound in a system of a turbine engine by:

applying a volume estimate, a pressure measurement, a temperature measurement, and a constant to a thermodynamic state model to generate a residual;

when the residual does not satisfy a threshold, adjusting the volume estimate and performing an additional iteration; and when the residual satisfies the threshold, outputting the volume estimate as the volume of the chemical compound;

determine a mass of the chemical compound based on the volume of the chemical compound and a volume of the system;

iteratively determine a mass loss of the chemical compound based on the mass of the chemical compound using a system of equations;

adjust at least one of a position of a valve or a pump schedule of the system when the mass is below a first threshold; and disable the system when the mass is below a second threshold.

* * * * *